US012038712B2

(12) United States Patent
Arai

(10) Patent No.: US 12,038,712 B2
(45) Date of Patent: Jul. 16, 2024

(54) CONVEYING DEVICE AND IMAGE FORMING APPARATUS INCORPORATING THE CONVEYING DEVICE

(71) Applicant: Daisuke Arai, Tokyo (JP)

(72) Inventor: Daisuke Arai, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 302 days.

(21) Appl. No.: 17/520,883

(22) Filed: Nov. 8, 2021

(65) Prior Publication Data

US 2022/0153544 A1 May 19, 2022

(30) Foreign Application Priority Data

Nov. 13, 2020 (JP) ................................ 2020-189723

(51) Int. Cl.
*G03G 15/00* (2006.01)
*B65H 5/06* (2006.01)
(Continued)

(52) U.S. Cl.
CPC ......... *G03G 15/6567* (2013.01); *B65H 5/062* (2013.01); *B65H 7/02* (2013.01);
(Continued)

(58) Field of Classification Search
CPC ... B65H 7/06; B65H 7/08; B65H 7/10; B65H 7/14; B65H 9/10; B65H 9/103;
(Continued)

(56) References Cited

U.S. PATENT DOCUMENTS 10,011,447 B2 * 7/2018 Nakamura ............... B65H 9/16
2006/0232759 A1 * 10/2006 Fukube ............. G03G 15/6567 355/408

(Continued)

FOREIGN PATENT DOCUMENTS

JP 2005-035709 2/2005
JP 2008-074620 4/2008

(Continued)

OTHER PUBLICATIONS

Merriam-Webster Dictionary, p. 1 (attached) (Year: 2023).*

*Primary Examiner* — Prasad V Gokhale
(74) *Attorney, Agent, or Firm* — Harness, Dickey & Pierce, P.L.C.

(57) ABSTRACT

A conveying device includes a first pair of nipping rollers, a second pair of nipping rollers, a position corrector configured to correct a position of a recording medium in a width direction of the recording medium, an end position detector configured to detect an end position of the recording medium in the width direction, and circuitry configured to, in adjustment of the end position detector, stop conveying the recording medium in response to arrival of a leading end of the recording medium at the end position detector, cause the position corrector to move the recording medium toward an outside of the conveyance passage in the width direction to a position at which the end position detector is covered by the recording medium, adjust the output of the end position detector, and cause the end position detector to detect the recording medium.

20 Claims, 27 Drawing Sheets

(51) Int. Cl.

| | |
|---|---|
| ***B65H 7/02*** | (2006.01) |
| ***B65H 7/10*** | (2006.01) |
| ***B65H 7/14*** | (2006.01) |
| ***B65H 9/10*** | (2006.01) |

(52) U.S. Cl.
CPC ................ *B65H 7/10* (2013.01); *B65H 7/14* (2013.01); *B65H 9/103* (2013.01); *B65H 2553/412* (2013.01); *B65H 2553/414* (2013.01); *B65H 2553/416* (2013.01); *B65H 2801/06* (2013.01)

(58) Field of Classification Search
CPC ................ B65H 9/106; B65H 2511/12; B65H 2553/412; B65H 2553/414; B65H 2553/416; B65H 2701/1311; G03G 15/6567
See application file for complete search history.

(56) References Cited

U.S. PATENT DOCUMENTS

| | | | | |
|---|---|---|---|---|
| 2007/0296141 | A1* | 12/2007 | Inoue ....................... | B65H 9/04 271/226 |
| 2008/0251998 | A1 | 10/2008 | Muneyasu et al. | |
| 2012/0025457 | A1* | 2/2012 | Inoue ..................... | B65H 9/002 271/227 |
| 2013/0277172 | A1* | 10/2013 | Sako ...................... | B65H 9/006 198/401 |
| 2018/0152576 | A1 | 5/2018 | Arai | |
| 2018/0346271 | A1 | 12/2018 | Nakamura et al. | |
| 2019/0161298 | A1 | 5/2019 | Arai et al. | |

FOREIGN PATENT DOCUMENTS

| | | |
|---|---|---|
| JP | 2012-062172 | 3/2012 |
| JP | 2018-016492 | 2/2018 |
| JP | 2018-203538 | 12/2018 |
| JP | 2019-102932 | 6/2019 |

* cited by examiner

CONVEYING DEVICE AND IMAGE FORMING APPARATUS INCORPORATING THE CONVEYING DEVICE

CROSS-REFERENCE TO RELATED APPLICATIONS

This patent application is based on and claims priority pursuant to 35 U.S.C. § 119(a) to Japanese Patent Application No. 2020-189723, filed on Nov. 13, 2020, in the Japan Patent Office, the entire disclosure of which is hereby incorporated by reference herein.

BACKGROUND

Technical Field

Embodiments of the present disclosure relate to a conveying device and an image forming apparatus incorporating the conveying device.

Background Art

Known image forming apparatuses such as copiers and printers employ a conveying device. Such a conveying device is known to have a technique that corrects skew, i.e., an angular displacement, of a sheet being conveyed along a sheet conveyance passage in a known image forming apparatus and detects a lateral displacement of the sheet in the width direction orthogonal to the sheet conveyance direction (main scanning registration) to correct the sheet conveyance position to the reference position. However, the above-described known technique is not likely to correct the posture of the sheet with high accuracy when various sheets having different reflectance due to different colors are conveyed.

A known conveying device provides a technique of performing a correction operation by setting at least one of the light emission time of a detector that optically detects the posture of a sheet according to the reflectance of the sheet, a time interval to perform the correction operation, the light emission intensity of the detector, the conveying speed of a pair of rollers that nips and conveys the sheet in the sheet conveyance passage. In this technique, the detector detects the end of a sheet to calculate the amount of displacement of the sheet. The detector detects the end of the sheet by receiving reflected light that is emitted by a light source and reflected on the sheet.

Since the above-described detector has variation in accuracy of each part, the light emission amount and output level of the detector are adjusted by using a white sheet as a reference sheet so as to be detectable by the detector. Further, sheets actually used have various types of, for example, colors and transparencies. Therefore, after adjustment of a sheet, the adjusted value is further adjusted to use the sheet for image formation. Another known conveying device employs a technique of performing detection of a sheet and correction of the position of the sheet once, and changing the control setting of the detector according to the reflectance of the sheet after the detection and correction.

SUMMARY

Embodiments of the present disclosure described herein provide a novel conveying device including a first pair of nipping rollers, a second pair of nipping rollers, a position corrector, an end position detector, and circuitry. The first pair of nipping rollers is configured to contact and separate from each other. The first pair of nipping rollers is configured to nip and convey a recording medium. The second pair of nipping rollers is disposed upstream from the first pair of nipping rollers in a conveyance direction along a conveyance passage of the recording medium. The second pair of nipping rollers is configured to contact and separate from each other. The position corrector is configured to correct a position of the recording medium in a width direction of the recording medium conveyed in the conveyance passage. The end position detector is disposed extending outward from within the conveyance passage in the width direction of the recording medium and is configured to detect an end position of the recording medium in the width direction. The circuitry is configured to adjust an output of the end position detector. The circuitry is configured to, in adjustment of the end position detector, stop conveying the recording medium in response to arrival of a leading end of the recording medium at the end position detector, cause the position corrector to move the recording medium toward an outside to the conveyance passage in the width direction to a position at which the end position detector is covered by the recording medium, adjust the output of the end position detector, and cause the end position detector to detect the recording medium.

Further, embodiments of the present disclosure described herein provide an image forming apparatus including the above-described conveying device and an image forming device configured to form an image on the recording medium conveyed by the conveying device.

BRIEF DESCRIPTION OF THE SEVERAL VIEWS OF THE DRAWINGS

Exemplary embodiments of this disclosure will be described in detail based on the following figures, wherein.

Figure 1:
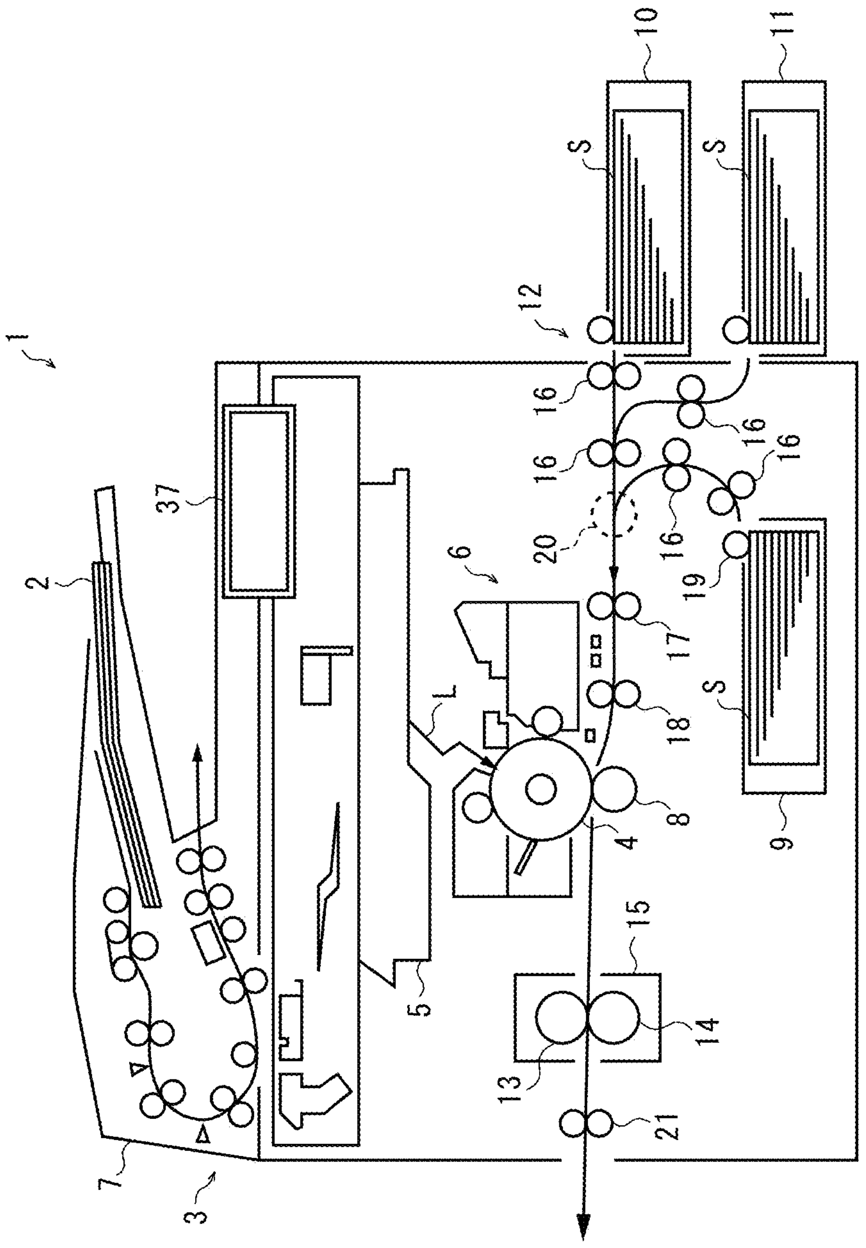
FIG. 1 is a schematic view of a configuration of an image forming apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms “a” “an,” and “the” are intended to include the plural forms as well, unless the context clearly indicates otherwise. It will be further understood that the terms “includes” and/or “including,” when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Next, a description is given of a configuration and functions of an image reading device and an image forming apparatus, according to an embodiment of the present disclosure, with reference to drawings. Note that identical parts or equivalents are given identical reference numerals and redundant descriptions are summarized or omitted accordingly.

Descriptions are given of a conveying device and an image forming apparatus according to an embodiment of the present disclosure, with reference to the following figures. Note that the embodiments are not limited to the illustrated examples and the specific examples described below.

FIG. 1 is a schematic view of a configuration of an image forming apparatus according to a first embodiment of the present disclosure.

In the first embodiment, the image forming apparatus is a copier. In FIG. 1, the image forming apparatus 1 includes an image reading device 3, a photoconductor drum 4, an exposure device 5, and an image forming device 6. The image reading device 3 optically reads image data of an original document 2. The exposure device 5 emits exposure light L based on the image data read by the image reading device 3, onto the surface of the photoconductor drum 4. The image forming device 6 includes the photoconductor drum 4 and forms a toner image on the surface of the photoconductor drum 4. The image reading device 3 includes a document conveyor 7 that conveys the original document 2 set on the image reading device 3.

A transfer roller 8 is disposed below the photoconductor drum 4 and a sheet feeding device 12 is disposed below the image forming device 6. The transfer roller 8 transfers a toner image formed on the circumferential surface of the photoconductor drum 4, onto the sheet S. The sheet feeding device 12 includes sheet feed trays 9, 10, and 11. Each of the sheet feed trays 9, 10, and 11 contains the sheet S that functions as a recording medium.

A fixing device 15 is disposed downstream from the image forming device 6 in the sheet conveyance direction. The fixing device 15 includes a heat roller 13 and a pressure roller 14. The heat roller 13 has a heat source in the inside. The pressure roller 14 is in contact with the heat roller 13.

Multiple pairs of sheet conveying rollers 16 and a pair of sheet conveying rollers 17, each disposed between the sheet feeding device 12 and the image forming device 6 to convey the sheet S conveyed from the sheet feeding device 12. Each of the pairs of sheet conveying rollers 16 includes a drive roller and a driven roller in press contact with the drive roller. The drive roller of each of the pairs of sheet conveying rollers 16 is driven by a drive unit to convey the sheet S that is nipped by the pairs of sheet conveying rollers 16. Similarly, the pair of sheet conveying rollers 17 that functions as a second pair of rollers includes a drive roller and a driven roller in press contact with the drive roller. The drive roller of the pair of sheet conveying rollers 17 is driven by a drive unit to convey the sheet S that is nipped by the pair of sheet conveying rollers 17. The driven roller of the pair of sheet conveying rollers 17 is moved by a contact-separation unit to selectively change between a press-contact position at which the driven roller contacts and presses the drive roller and a separation position at which the driven roller separates from the drive roller.

A pair of registration rollers 18 is disposed downstream from the pair of sheet conveying rollers 17 in the sheet conveyance direction. When the sheet S is conveyed by the pair of sheet conveying rollers 17, the pair of registration rollers 18 further conveys the sheet S toward the nip region between the photoconductor drum 4 and the transfer roller 8 at a predetermined timing. The pair of registration rollers 18 that functions as a first pair of nipping rollers is capable of performing a skew correction (angular displacement correction) and a main scanning registration correction (lateral displacement correction) on the sheet S. Note that the detailed configuration of the pair of registration rollers 18 is deferred.

Further, a control panel 37 having a display unit is disposed on the upper part of the housing of the image forming apparatus 1, that is, the upper face of the image reading device 3. The control panel 37 is operated by a user that uses the image forming apparatus 1.

Here, a description is given of regular image forming operations performed in the image forming apparatus 1.

The original document 2 is conveyed by the sheet conveying rollers from the document sheet tray in the document conveyor 7 in a direction indicated by arrow in FIG. 1. When the original document 2 passes over the image reading sensor provided in the image reading device 3, image data of the original document 2 is optically read. After being optically read by the image reading device 3, the image data of the original document 2 is converted to an electrical signal, and the converted image data is sent to the exposure device 5. Then, the exposure device 5 emits exposure light L based on the image data converted to the electrical signal, from the exposure device 5 to the circumferential surface of the photoconductor drum 4.

In the image forming device 6, the photoconductor drum 4 rotates in a clockwise direction in FIG. 1. After a series of known image forming processes, e.g., a charging process, an exposing process, and a developing process, a toner image is formed on the circumferential surface of the photoconductor drum 4. The toner image formed on the photoconductor drum 4 is transferred onto the sheet S conveyed from the pair of registration rollers 18, at the transfer nip region at which the photoconductor drum 4 and the transfer roller 8 contact each other.

Figure 2:
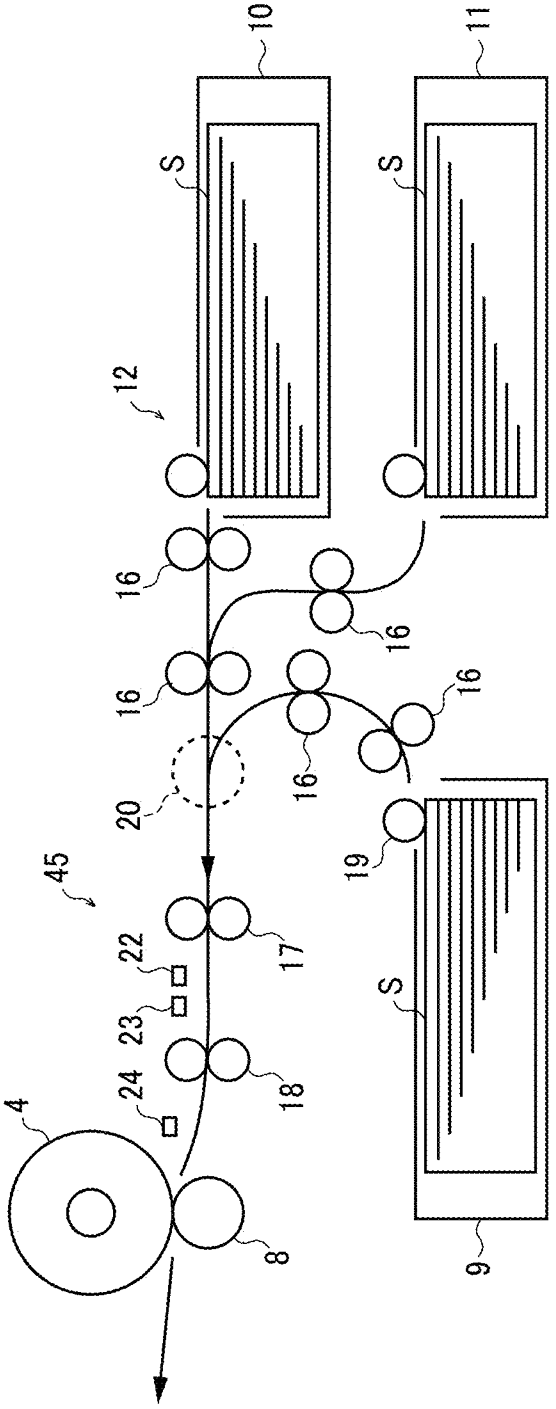
FIG. 2 is a schematic view of a configuration of a conveying device according to the first embodiment of the present disclosure.

FIG. 2 is a schematic view of a configuration of a conveying device according to the first embodiment of the present disclosure.

As illustrated in FIGS. 1 and 2, one of the sheet feed trays 9, 10, and 11 of the sheet feeding device 12 is selected automatically or manually. Note that the sheet feed trays 9, 10, and 11 of the sheet feeding device 12 basically have an identical configuration to each other. While the sheet feed tray 9 is disposed inside the housing of the image forming apparatus 1, the sheet feed trays 10 and 11 are disposed outside the housing of the image forming apparatus 1. Here, it is assumed that the sheet feed tray 9 is selected. The sheet S placed on top of the sheet feed tray 9 is separated from the rest of the sheets on the sheet feed tray 9 by a sheet feed roller 19 and is conveyed toward a curved conveyance passage along which the corresponding pairs of sheet conveying rollers 16 are disposed.

Thereafter, the sheet S travels in the curved sheet conveying toward a merging portion 20 where the sheet conveyance passage of the sheet P fed from the sheet feed tray 9 merges with respective sheet conveyance passages of the sheet P fed from the sheet feed trays 10 and 11, each being disposed outside the housing of the image forming apparatus 1. After passing through the merging portion 20, the sheet P is conveyed to the pair of registration rollers 18 via a straight sheet conveying passage along which the pair of sheet conveying rollers 17 and the pair of registration rollers 18 are disposed. After performing the skew correction (i.e., correction of angular displacement of the sheet S) and the main scanning registration correction (i.e., correction of lateral displacement of the sheet S), the pair of registration rollers 18 rotates at a timing in synchrony with movement of the toner image firmed on the surface of the photoconductor drum 4. Then, the sheet P is conveyed toward the transfer nip region.

Note that, when the sheet S is conveyed toward the transfer nip region, the transfer roller 8 and the photoconductor drum 4 respectively rotate in a direction to convey the sheet S, so that each of the transfer roller 8 and the photoconductor drum 4 functions as a downstream conveyance roller that is disposed downstream from the pair of registration rollers 18 in the sheet conveyance direction.

The sheet S onto which the toner image is transferred in the transfer nip region is conveyed to the fixing device 15 via the sheet conveyance passage. In the fixing device 15, the sheet S is conveyed to a gap between the heat roller 13 and the pressure roller 14, so that the toner image is fixed to the sheet S by application of heat and pressure. After the image is fixed to the sheet S, the sheet S is ejected by a pair of sheet ejection rollers 21 to the outside of the housing of the image forming apparatus 1, so that the sheet S is ejected and stacked on a sheet ejection tray. Due to these operations, a series of image forming operations is completed.

Figure 3:
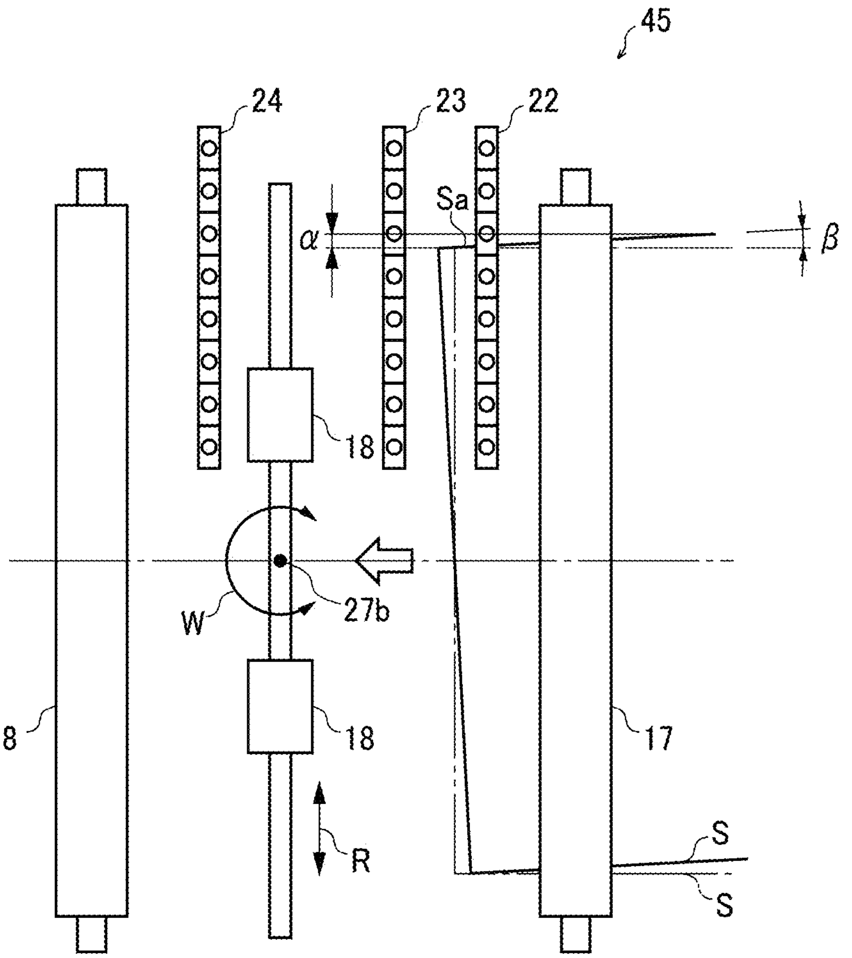
FIG. 3 is a schematic plan view of a skew correction operation performed by the conveying device according to the first embodiment of the present disclosure.

FIG. 3 is a schematic plan view of a skew correction operation according to the first embodiment of the present disclosure.

As described above, the image forming apparatus 1 includes the straight sheet conveying passage that extends substantially linearly along the sheet conveyance direction of the sheet S. The straight sheet conveying passage functions as a sheet conveyance passage from the merging portion 20 to the transfer nip region. The straight sheet conveying passage is defined by a pair of straight conveyance guide plates disposed to sandwich the front and back faces of the sheet S when the sheet S is conveyed. As illustrated in FIG. 3, the pair of sheet conveying rollers 17, the first CIS 22, the second CIS 23, the pair of registration rollers 18, and the third CIS 24 are disposed direction in this order from upstream in the sheet conveyance, along the straight sheet conveying passage.

Each of the first CIS 22, the second CIS 23, and the third CIS 24 is a contact image sensor including a plurality of photosensors aligned in the width direction of the sheet S, so as to optically detect the side edge Sa of the sheet S when the sheet S passes each of the plurality of photosensors. According to this configuration, each of the first CIS 22, the second CIS 23, and the third CIS 24 functions as an end position detector.

Figure 4:
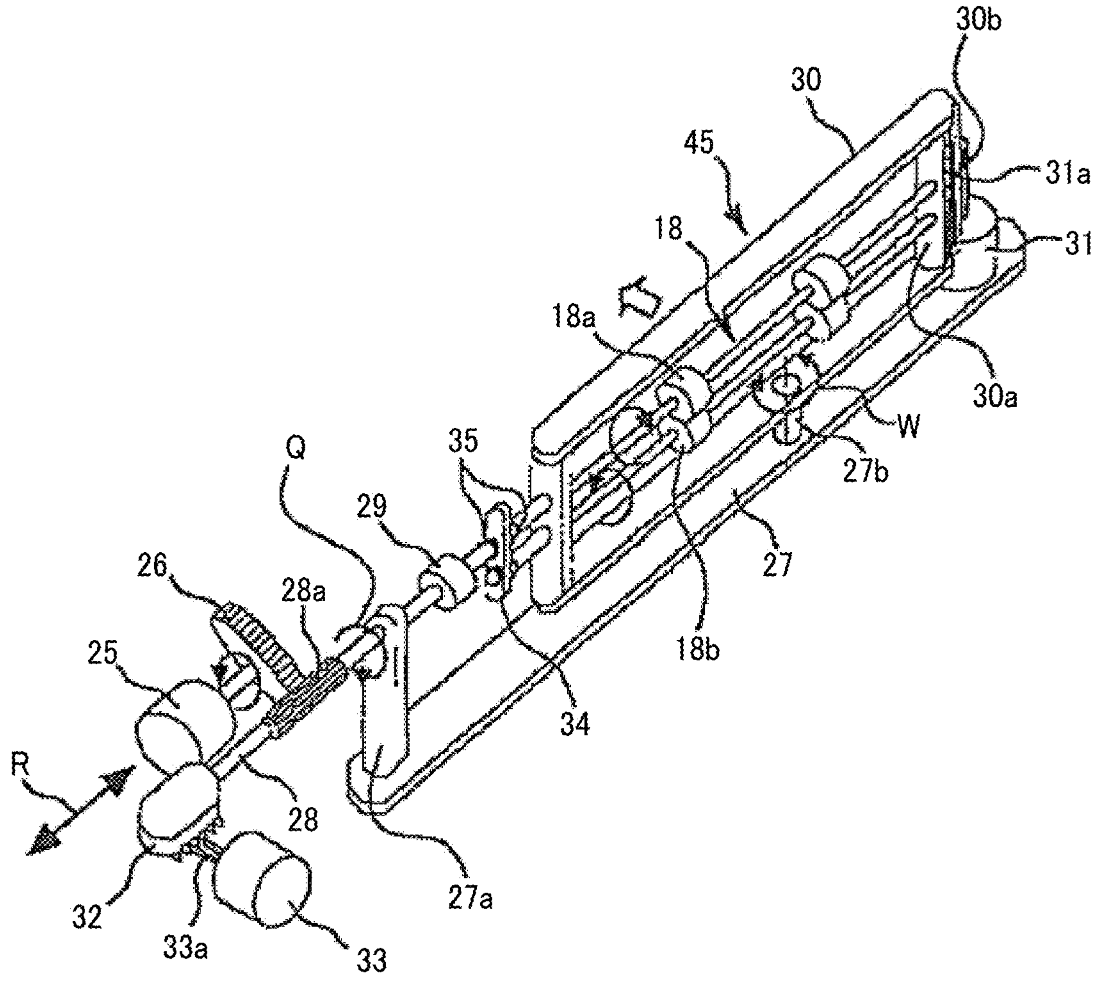
FIG. 4 is a schematic perspective view of a configuration of a driving mechanism included in the conveying device according to the first embodiment of the present disclosure.

Next, a detailed description is given of the configuration of the pair of registration rollers 18, with reference to FIG. 4.

FIG. 4 is a schematic perspective view of a configuration of a driving mechanism included in the conveying device according to the first embodiment of the present disclosure.

The pair of registration rollers 18 includes a plurality of rollers divided and disposed in the width direction of the sheet S. The plurality of rollers includes a drive roller **18*a* and a driven roller 18*b*. The drive roller 18*a* of the pair of registration rollers 18 is driven by a first drive motor 25. The driven roller 18*b* of the pair of registration rollers 18 is rotated along with rotation of the drive roller 18*a*. Note that the pair of registration rollers 18 according to the present embodiment is a pair of rollers having a plurality of rollers divided and disposed in the width direction of the sheet S. However, the configuration of the pair of registration rollers 18 is not limited to this configuration. For example, the pair of registration rollers 18** may include rollers, each extending in the width direction of the sheet S without being divided.

The pair of registration rollers 18 is rotatable in the angular direction of the sheet S i.e., direction indicated by a bidirectional arrow W in FIG. 3 and parallel to a plane of sheet conveyance of the sheet) and also movable in the width direction of the sheet S (i.e., direction indicated by a bidirectional arrow R in FIG. 3).

The first drive motor 25 is fixed to the frame of the housing of the image forming apparatus 1. A drive gear 26 is mounted on the output shaft of the first drive motor 25. The support shaft of the drive roller **18*a* and the support shaft of the driven roller 18*b* are rotatably supported by the roller holding member 30 that is supported by the frame 27. A frame side rotary shaft 28 is disposed coaxially with the support shaft of the drive roller 18*a* and is rotatably supported by an upright portion 27*a* of the frame 27. The frame side rotary shaft 28 has a gear portion 28*a* having a sufficient length in the axial direction. The gear portion 28*a* of the frame side rotary shaft 28 is meshed with the drive gear 26. Further, the support shaft of the drive roller 18*a* and the frame side rotary shaft 28 are coupled with each other by a coupling 29. According to this configuration, as the frame side rotary shaft 28 is driven and rotated by the driving force of the first drive motor 25 in a direction indicated by arrow Q in FIG. 4, a rotation force applied by the rotation of the frame side rotary shaft 28 is transmitted to the support shaft of the drive roller 18*a* via the coupling 29. This transmission of the rotation force rotates the drive roller 18*a*, so that the driven roller 18*b* is rotated together with the drive roller 18*a***.

The coupling 29 is a shaft coupling such as a constant velocity (universal) joint and a universal joint. With the coupling 29, even when the pair of registration rollers 18 rotates with the roller holding member 30 to change the shaft angle of the support shaft of the drive roller **18*a* and the frame side rotary shaft 28, the rotation driving force is transmittable without changing the rotation speed of the pair of registration rollers 18**.

The drive roller **18*a* and the driven roller 18*b* are supported by the rectangular roller holding member 30 shape rotatably and movably in the axial direction. Specifically, both ends of each support shaft of the drive roller 18*a* and the driven roller 18*b* are supported rotatably and movably in the axial direction, via a bearing that is fixed to the roller holding member 30. Further, a gear portion 30*b* is attached to the roller holding member 30 in the width direction of the sheet S. The gear portion 30***b* is an arc-shape portion integrally projected from the column portion 30*a*. A sufficient gap is provided between the column portion 30*a* and the gear portion 30*b* in the width direction of the sheet S. According to this configuration, even if the drive roller 18*a* and the driven roller 18*b* slide in the width direction of the sheet S, the support shall of the drive roller 18*a* and the support shaft of the driven roller 18*b* do not interfere with the gear portion 30*b*.

The roller holding member 30 is supported with respect to the frame 27 and is rotatable about the shaft portion 27*b*. The frame 27 functions as a part of the frame of the housing of the image forming apparatus 1. A second drive motor 31 is rotatable in the normal and reverse directions and is disposed at one end of the frame 27 in the width direction of the sheet. The second drive motor 31 includes a motor shaft 31*a* with a gear portion that is meshed with the gear portion 30*b* of the roller holding member 30. Due to this configuration, the rotations in the normal and reverse directions of the second drive motor 31 the pair of registration rollers 18 together with the roller holding member 30, about the shaft portion 27*b* in the direction indicated by the bidirectional arrow W in FIGS. 3 and 4.

Based on the detection results of the first CIS 22, the second CIS 23, and the third CIS 24, the second drive motor 31 drives the pair of registration rollers 18 and the roller holding member 30 to rotatably change in the direction of inclination with respect to the sheet conveyance direction of the sheet S. Note that a known encoder is mounted on the second drive motor 31 to detect the amount of displacement of the direction of inclination and the direction of displacement with respect to the reference position of the pair of registration rollers 18. Accordingly, the pair of registration rollers 18 performs skew correction based on the detection results of the first CIS 22, the second CIS 23, and the third CIS 24. According to this configuration, the second drive motor 31 functions as a skew corrector.

Note that the present embodiment has the above-described configuration in which the pair of registration rollers 18 rotates about substantially a center position in the width direction of the sheet. However, the pair of registration rollers 18 may rotate about another position.

A rack gear portion 32 is mounted on the opposite end of the frame side rotary shaft 28 in the width direction of the sheet. The frame side rotary shall 28 is rotatably supported by the frame 27. The rack gear portion 32 is rotatable relative to the frame side rotary shaft 28. The rack gear portion 32 is supported by the housing of the image forming apparatus 1 so that the rack gear portion 32 is slidable, together with the frame side rotary shaft 28, without rotation along a guide rail in the width direction of the sheet indicated by bidirectional arrow R in FIG. 4. A third drive motor 33 is disposed in the housing of the image forming apparatus 1. The third drive motor 33 includes a motor shaft 33*a* with a pinion gear that meshes with the rack gear portion 32.

A coupling member 34 is disposed between the coupling 29 and a pillar at the opposite end of the roller holding member 30 in the width direction of the sheet. The coupling member 34 rotatable couples the drive roller 18*a* and the driven roller 18*b* to move together with each other in the width direction of the sheet. The coupling member 34 is held by respective retaining rings 35 located in the groove formed in the respective support shafts of each of the drive roller 18*a* and the driven roller 18*b*. Due to movement of the coupling member 34, as the drive roller 18*a* moves in the width direction of the sheet, the driven roller 18*b* moves together with the drive roller 18*a*, by the same distance in the width direction of the sheet as the drive roller 18*a*.

Due to this configuration, the forward and reverse rotations of the third drive motor 33 moves the pair of registration rollers 18 in the width direction of the sheet in directed by the directional arrow R in FIGS. 3 and 4. The third drive motor 33 moves the frame side rotary shaft 28 and the pair of registration rollers 18 in the width direction of the sheet, based on the detection results of the first CIS 22, the second CIS 23, and the third CIS 24.

A known encoder is mounted on the motor shaft 33*a* of the third drive motor 33 to detect the amount of displacement and direction of displacement in the width direction of the sheet with respect to the reference position of the pair of registration rollers 18. Accordingly, the pair of registration rollers 18 performs the main scanning registration correction based on the detection results of the first CIS 22, the second CIS 23, and the third CIS 24. According to this configuration, the third drive motor 33 functions as a main scanning registration corrector that is a positional deviation corrector.

The parts and components such as the third drive motor 33, the rack gear portion 32, the frame side rotary shaft 28, the coupling 29, the coupling member 34, and the roller holding member 30 are included in a moving mechanism that moves the pair of registration rollers 18 in the width direction of the sheet.

Further, while holding and conveying the sheet S, the pair of registration rollers 18 rotates together with the roller holding member 30, based on the detection results of the first CIS 22, the second CIS 23, and the third CIS 24. By so doing, the pair of registration rollers 18 corrects the positional deviation amount of the sheet S. That is, the pair of registration rollers 18 functions as a member to perform skew correction of angular displacement (correction of rotational deviation) of the sheet S by changing the direction of the sheet S in the sheet conveyance passage, to the direction inclined with respect to the sheet conveyance direction.

Further, while holding and conveying the sheet S, the pair of registration rollers 18 moves in the width direction of the sheet based on the detection results of the first CIS 22, the second CIS 23, and the third CIS 24. By so doing, the pair of registration rollers 18 corrects the positional deviation amount of the sheet S. That is, the pair of registration rollers 18 also functions as a member to perform correction of lateral displacement of the sheet S, i.e., the main scanning registration correction of the sheet S, by changing the position of the sheet S the sheet conveyance passage, along the width direction of the sheet S.

In the present embodiment, the pair of registration rollers 18 rotates while nipping the sheet S. By so doing, the sheet S is conveyed to ward the transfer nip region after the skew correction and the main scanning registration correction are performed on the sheet S. The first drive motor 25 is a rotation number variable motor to drive and rotate the pair of registration rollers 18 to change the conveying speed of the sheet S. After a photosensor detects that the pair of registration rollers 18 nips the sheet S, the pair of registration rollers 18 performs a desired skew correction and a desired main scanning registration correction. Then, the sheet conveying speed of the pair of registration rollers 18 is changed based on the detection timing of the photosensor. That is, in order to synchronize the timing at which the pair of registration rollers 18 conveys the sheet S to the transfer nip region with the timing at which the toner image formed on the surface of the photoconductor drum 4 reaches the transfer nip region, the pair of registration rollers 18 changes the sheet conveying speed. By so doing, the pair of registration rollers 18 performs the skew correction and the main scanning registration correction on the sheet S and simultaneously forms an image at a desired position of the sheet S.

Note that the sheet conveying speed of the pair of registration rollers 18 is changed so as not to generate distortion on the image to be transferred onto the sheet S due to linear velocity difference between the sheet S and the photoconductor drum 4 immediately after the leading end of the sheet S reaches the transfer nip region.

As illustrated in FIG. 3, the first CIS 22 and the second CIS 23 are disposed between the pair of sheet conveying rollers 17 and the pair of registration rollers 18. As the relation of positions of the first CIS 22 and the second CIS 23, the first CIS 22 is upstream from the second CIS 23 in the sheet conveyance direction. The third CIS 24 is disposed between the pair of registration rollers 18 and the transfer roller 8.

In the present embodiment, as the first sheet S is conveyed by the first CIS 22 and the second CIS 23 or by the second CIS 23 and the third CIS 24, the positional deviation amount of the first sheet S with respect to the direction of inclination, that is, the skew amount of the sheet S is detected. Then, the skew correction is performed based on the detection results of the first CIS 22 and the second CIS 23 or of the second CIS 23 and the third CIS 24. At the same time, as the first sheet S is conveyed by the first CIS 22 and the second CIS 23, the positional deviation amount of the first sheet S in the width direction of the sheet, that is, the main scanning registration amount of the sheet S is detected. Then, the main scanning registration correction is performed based on the detection results of the first CIS 22 and the second CIS 23.

Now, a detailed description is given of the skew correction.

Figure 5:
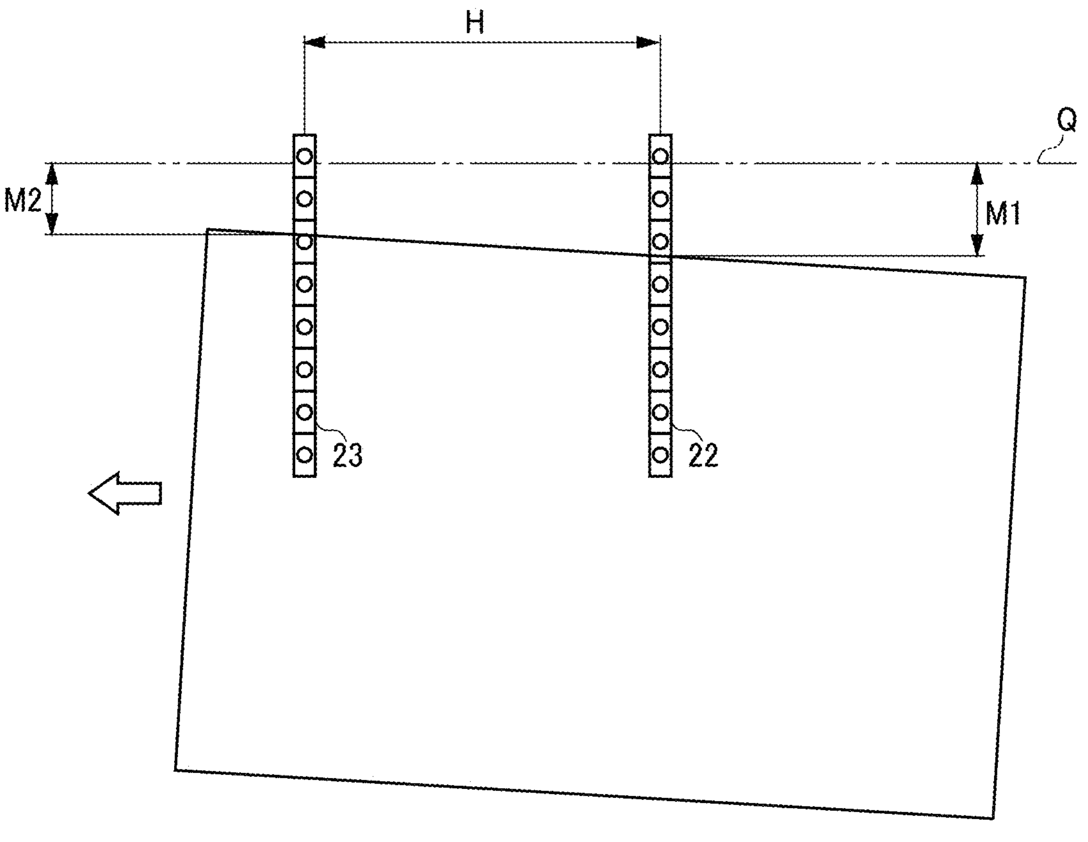
FIG. 5 is a schematic view of the skew correction operation performed by the conveying device according to the first embodiment of the present disclosure.

FIG. 5 is a schematic view of the skew correction operation performed by the conveying device according to the first embodiment of the present disclosure.

First, as illustrated in FIG. 3, both the first CIS 22 and the second CIS 23 or both the second CIS 23 and the third CIS 24 detect that the sheet S is inclined (skewed) by a skew angle β in the normal direction of the skew correction direction W (i.e., the counterclockwise direction in FIG. 3), with respect to the reference position that indicated by a broken line without skew. Next, a controller 36 described below determines the skew amount (skew angle) β as a skew correction amount, then causes the pair of registration rollers 18 to rotate by the angle β in the opposite direction in the skew correction direction W (i.e., the clockwise direction in FIG. 3) while the pair of registration rollers 18 nips the sheet S.

Specifically, as illustrated in FIG. 5, "M1" represents a positional deviation amount in the width direction of the sheet S detected by the first CIS 22 (or the second CIS 23), "M2" represents a positional deviation amount in the width direction of the sheet S detected by the second CIS 23 (or the third CIS 24), and "H" represents a distance between the first CIS 22 and the second CIS 23 or between the second CIS 23 and the third CIS 24. The skew amount β that is a positional deviation amount in the direction of inclination of the sheet S is detected based on a value (M2−M1)/H, which is obtained by dividing the difference of the positional deviation amount M1 from the positional deviation amount M2 by the distance H.

Then, the correction angle β to be corrected is obtained with the value ((M2−M1)/H) as tan β. Then, in order to cancel out the correction angle β, the pair of registration rollers 18 is rotated in the reverse direction while the pair of registration rollers 18 is nipping the sheet S.

Note that the positional deviation amounts M1 and M2 in the width direction of the sheet are the amounts deviated from the reference position of the sheet S indicated by a broken line in FIG. 5.

Figure 6:
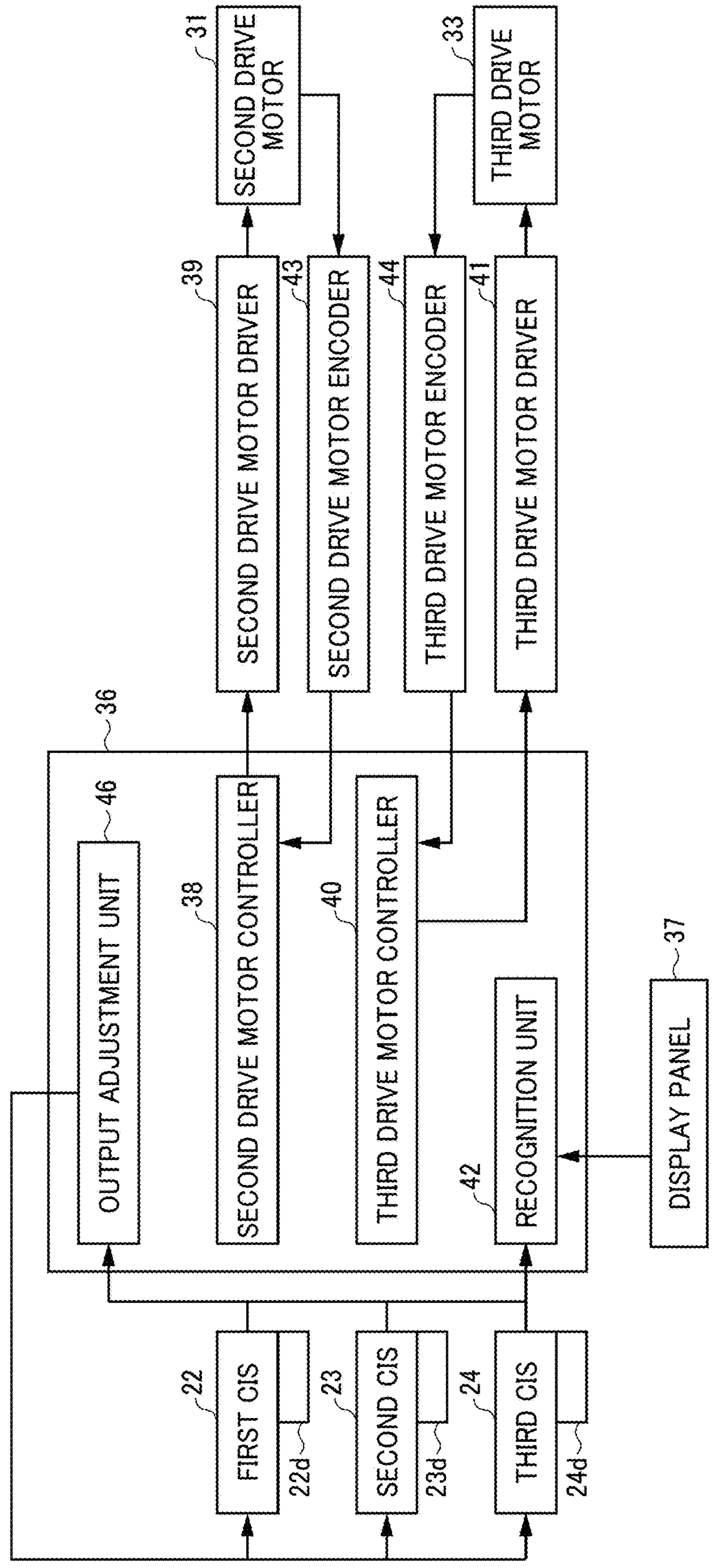
FIG. 6 is a block diagram illustrating a configuration of a controller controlling the conveying device according to the first embodiment of the present disclosure.

FIG. 6 is a block diagram illustrating a configuration of a controller controlling the conveying device according to the first embodiment of the present disclosure.

The controller 36 illustrated in FIG. 6 calculates the skew amount β based on the detection results of the first CIS 22 and the second CIS 23 or the detection results of the second CIS 23 and the third CIS 24. The controller 36 then calculates the number of count number p1 of the encoder of the second drive motor 31 based on the skew amount β. Then, the number of counts p1 is stored as a target conveyance encoder count number p1 of the second drive motor 31. While performing the positional detection based on the target conveyance encoder count number p1, the second drive motor controller 38 controls the second drive motor driver 39 to drive the second drive motor 31.

Next, a detailed description is given of the main scanning registration correction.

First, as illustrated in FIG. 3, both the first CIS 22 and the second CIS 23 or both the second CIS 23 and the third CIS 24 detect that the sheet S is shifted by a distance α toward one end in the width direction of the sheet, which is downward in FIG. 3, with respect to the reference position. Next, the controller 36 determines the main scanning registration amount α as a main scanning registration correction amount, then causes the pair of registration rollers 18 to shill by the distance α toward the opposite end in the width direction of the sheet, which is upward in FIG. 3, while the pair of registration rollers 18 nips the sheet S.

Specifically, based on the average amount (M1+M2)/2 of the above-described positional deviation amounts M1 and M2, the main scanning registration amount α that is a positional deviation amount (lateral displacement) in the width direction of the sheet S is detected.

Then, the controller 36 determines the obtained value (M1+M2)/2 as the main scanning registration amount α. Then, in order to cancel out the value α, the controller 36 causes the pair of registration rollers 18 to change the position while the pair of registration rollers 18 is nipping the sheet S.

The controller 36 calculates the main scanning registration amount α based on the detection results of the first CIS 22 and the second CIS 23 or the detection results of the second CIS 23 and the third CIS 24. The controller 36 then calculates the number of counts p2 of the encoder of the third drive motor 33 based on the main scanning registration amount α. Then, the number of counts p2 is stored as a target conveyance encoder count number p2 of the third drive motor 33. While performing the positional detection based on the target conveyance encoder count number p2, the third drive motor controller 40 controls the third drive motor driver 41 to drive the third drive motor 33.

Note that the target conveyance encoder count numbers p1 and p2 are calculated by previously researching the correction amount (conveyance amount) per count (pulse) with calculation from the set value, for example, and storing the correction amount (conveyance amount) in the calculation unit.

As described above, in the present embodiment, based on the detection results of multiple CISs, for example, the first CIS 22, the second CIS 23, and the third CIS 24, the pair of registration rollers 18 rotates in the direction of inclination to perform the skew correction on the sheet S and simultaneously shifts in the width direction of the sheet to perform the main scanning registration correction on the sheet S without stopping conveyance of the sheet S by the pair of registration rollers 18. By so doing, when compared with a configuration in which the skew correction and the main scanning registration correction are separately performed on the sheet S while conveyance of the sheet S is stopped, the configuration of the image forming apparatus 1 according to the present embodiment significantly enhances the productivity. Further, when the skew correction and the main scanning registration correction are performed on the sheet S, a linear velocity difference does not occur between multiple rollers of the pair of registration rollers 18 being separated apart in the width direction of the sheet S. Therefore, even if a sheet S is a thin paper or has a low coefficient of friction on the surface, when the sheet S is conveyed, the sheet S is not warped or slipped.

In the present embodiment, the first CIS 22, the second CIS 23, and the third CIS 24, each being disposed in the sheet conveyance passage, are used so that the pair of registration rollers 18 performs the skew correction of the sheet S and the main scanning registration correction of the sheet S, each in two steps.

In other words, the first CIS 22 and the second CIS detect the skew amount of the sheet S and the main scanning registration amount of the sheet S while the pair of registration rollers 18 nips and conveys the sheet S. Then, based on the detection result, the skew correction is performed on the sheet S and, at the substantially same time, the main scanning registration correction is performed on the sheet S. Hereinafter, the above-described skew correction and the main scanning registration correction are collectively referred to as a "primary correction operation."

Further, after the primary correction operation is performed, the second CIS 23 and the third CIS 24 detect the skew amount of the sheet S and the main scanning registration amount of the sheet S while the pair of registration rollers 18 nips and conveys the sheet S. Then, based on the detection result, the skew correction is performed on the sheet S and, at the substantially same time, the main scanning registration correction is performed on the sheet S. Hereinafter, the above-described skew correction and the main scanning registration correction are collectively referred to as a "secondary correction operation."

In the secondary correction operation, based on the detection result of the first CIS 22 or the second CIS 23 and the detection result of the third CIS 24, the correcting operation that corrects the direction of inclination of the sheet S and the posture of the sheet S in the width direction of the sheet S are repeated to the extent possible immediately before the leading end of the sheet S reaches the transfer nip region. Details of this operation are described below.

In the present embodiment, before the sheet S is conveyed to the pair of registration rollers 18, the second drive motor 31 causes the pair of registration rollers 18 to rotate from an angular reference position that functions as an initial position (which is a position corresponding to the normal position of the sheet S that has no angular displacement) based on the detection result of the first CIS 22 or the second CIS 23, so as to correctly face the end of the sheet S that is displaced in the direction of inclination so as to correct the skew amount of the sheet S. Further, concurrently with this rotational operation, the third drive motor 33 causes the pair of registration rollers 18 to move from a lateral reference position (which is a position corresponding to the normal position of the sheet S that has no lateral displacement in the width direction of the sheet S), so as to correct the main scanning registration amount of the sheet S.

Then, while the pair of registration rollers 18 is nipping the pair of registration rollers 18, the second drive motor 31 causes the pair of registration rollers 18 to rotate to the angular reference position to correct the skew amount of the sheet S and, at the same time, the third drive motor 33 causes the pair of registration rollers 18 to move to the lateral reference position to correct the main scanning registration amount that is the lateral displacement in the width direction of the sheet S. The series of correction operations is the above-described primary correction operation.

The secondary correction operation is performed after the primary correction operation. Further, after the pair of registration rollers 18 has performed the skew amount of the sheet S and the main scanning registration amount of the sheet S, the posture of the sheet S is detected by the first CIS 22 (or the second CIS 23) and the third CIS 24. The pair of registration rollers 18 is disposed between the first CIS 22 (or the second CIS 23) and the third CIS 24. Then, based on the detection results, the skew amount of the sheet S and the main scanning registration amount of the sheet S are further corrected. This correction operation is the secondary correction operation.

In the secondary correction operation, the pair of registration rollers 18 further rotates from the above-described angular reference position while nipping the sheet S, so that the skew amount of the sheet S is further corrected based on the detection result of the first CIS 22 (or the second CIS 23) and the detection result of the third CIS 24. Simultaneously, the pair of registration rollers 18 further moves from the above-described lateral reference position in the width direction of the sheet S while nipping the sheet S, so that the main scanning registration amount of the sheet S is further corrected based on the detection results.

As described above, in the present embodiment, based on the detection results before the sheet S is nipped by the pair of registration rollers 18, the pair of registration rollers 18 performs the skew correction and the main scanning registration correction as the primary correction operation while the pair of registration rollers 18 nips the sheet S. Thereafter, while nipping and conveying the sheet S, the pair of registration rollers 18 performs the skew correction and the main scanning registration correction again as the secondary correction operation, based on the detection result of the first CIS 22 (or the second CIS 23) and the detection result of the third CIS 24.

The secondary correction operation is performed since it is slightly likely that skew (angular displacement), main scanning registration displacement (lateral displacement), or both occur due to impact that is generated when the sheet S enters into the nip region of the pair of registration rollers 18 and due to eccentricity or assembly failure of the rollers of the pair of registration rollers 18.

In the present embodiment, the pair of registration rollers 18 performs the primary correction operation followed by the secondary correction operation. By so doing, the above-described inconveniences are prevented, thereby performing the secondary correction and the main scanning registration correction with higher accuracy.

In the present embodiment, when the first CIS 22 (or the second CIS 23) and the third CIS 24 are used in the secondary correction operation, the feedback control is executed to correct the skew amount and the main scanning registration amount of the sheet S based on the detection result of the first CIS 22 (or the second CIS 23) and the detection result of the third CIS 24 while the detection results are substantially consecutively detected. Specifically, in the secondary correction operation, the position information of the sheet S is sequentially detected by two CISs, the skew amount and the main scanning registration amount of the sheet S are calculated based on the position information obtained by the two CISs and then are fed back to the controller 36. Then, the skew correction amount and the main scanning registration amount of the sheet S are sequentially corrected, and the second drive motor 31 and the third drive motor 33 are driven and controlled based on the correction amounts.

Such correction operations are repeated until the timing immediately before the leading end of the sheet S reaches the transfer nip region. By so doing, the positional deviation of the sheet S in the secondary correction operation and the correction error are corrected with good responsiveness, thereby performing the skew correction and the main scanning registration correction with higher accuracy.

FIG. 6 is a block diagram illustrating the controller 36 that controls various operations performed in the image forming apparatus 1.

The controller 36 that is constructed by known microcomputers includes a recognition unit 42, the second drive motor controller 38, and the third drive motor controller 40. Further, the controller 36 performs output adjustment on each of the first CIS 22, the second CIS 23, and the third CIS 24. In this case, the controller 36 functions as an adjuster.

The recognition unit 42 includes a function to count the main scanning registration amount and the skew amount of the sheet S according to the information from each of the first CIS 22, the second CIS 23, and the third CIS 24 and a function to recognize the reflectance of the sheet S based on the detection results of the first CIS 22, the second CIS 23, and the third CIS 24, which is described below.

The second drive motor controller 38 determines the rotational direction and the rotation amount (rotation angle) of the second drive motor 31 based on the skew amount obtained from the recognition unit 42. The third drive motor controller 40 determines the rotational direction and the rotation amount (rotation angle) of the third drive motor 33 based on the main scanning registration amount obtained from the recognition unit 42.

A second drive motor driver 39 receives a signal from the second drive motor controller 38 to drive the second drive motor 31. Similarly, a third drive motor driver 41 receives a signal from the third drive motor controller 40 to drive the third drive motor 33. A second drive motor encoder 43 detects the rotation amount of the second drive motor 31. Similarly, a third drive motor encoder 44 detects the rotation amount of the third drive motor 33.

Of the above-described parts and components, the pair of sheet conveying rollers 17 that functions as a second pair of nipping rollers, the pair of registration rollers 18 including the drive roller 18*a* and the driven roller 18*b*, the first CIS 22, the second CIS 23, the third CIS 24, the first drive motor 25, the drive gear 26, the frame 27, the frame side rotary shaft 28, the coupling 29, and the roller holding member 30 are included in a conveying device 45 as illustrated in FIGS. 2, 3, and 4.

The conveying device 45 further includes the second drive motor 31, the rack gear portion 32, the third drive motor 33, the coupling member 34, the retaining rings 35, and the controller 36 that includes the second drive motor controller 38, the third drive motor controller 40, and the recognition unit 42.

The conveying device 45 further includes the second drive motor driver 39, the third drive motor driver 41, the second drive motor encoder 43, and the third drive motor encoder 44.

Figure 7:
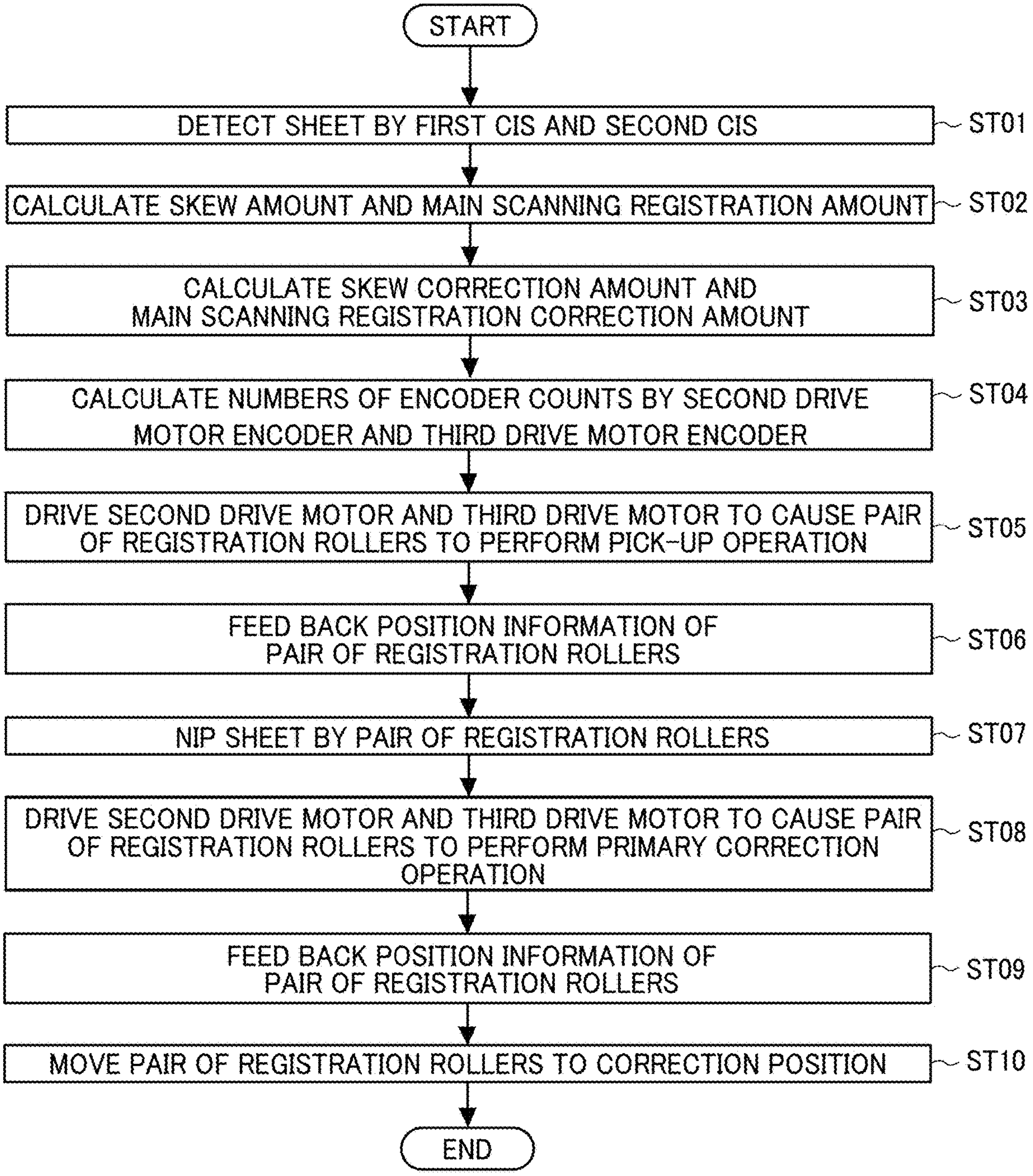
FIG. 7 is a flowchart of a primary correction operation performed by the conveying device according to the first embodiment of the present disclosure.

FIG. 7 is a flowchart of the primary correction operation performed by the conveying device 45.

First, the first CIS 22 and the second CIS 23 detect the sheet S (step ST01) to calculate the skew amount (i.e., amount of angular displacement) and the main scanning registration amount (i.e., amount of lateral displacement) (step ST02). Next, based on the detection results, the controller 36 calculates the skew correction amount and the main scanning registration correction amount (step ST03). As the result of calculation, the controller 36 determines correction amounts to correct the position of the sheet S in the primary correction operation.

Then, the second drive motor encoder 43 and the third drive motor encoder 44 calculate the respective numbers of encoder counts based on the correction amounts (step ST04). According to the calculated numbers of encoder counts, the second drive motor driver 39 and the third drive motor driver 41 drives the second drive motor 31 and the third drive motor 33, respectively, so that the pair of registration rollers 18 rotates and simultaneously moves in the width direction of the sheet S to perform the pick-up operation (step ST05). At this time, the second drive motor encoder 43 and the third drive motor encoder 44 consecutively feed back the position information of the pair of registration rollers 18, so that the pair of registration rollers 18 moves by the predetermined amount of movement (step ST06).

Thereafter, the pair of registration rollers 18 nips the sheet S (step ST07). Then, as a contact-separation unit causes the driven roller of the pair of sheet conveying rollers 17 to separate from the drive roller of the pair of sheet conveying rollers 17 to the separation position, the sheet S is released from the pair of sheet conveying rollers 17. Then, the second drive motor 31 and the third drive motor 33 drive the pair of registration rollers 18 to rotate to return to the reference position and move in the width direction of the sheet S, so as to perform the primary correction operation (step ST08). At this time, the second drive motor encoder 43 and the third drive motor encoder 44 consecutively feed back the position information of the pair of registration rollers 18, so that the pair of registration rollers 18 moves by the predetermined amount of movement (step ST09). Then, as the pair of registration rollers 18 is moved to the predetermined correction position, the primary correction operation completes (ST10).

Figure 8:
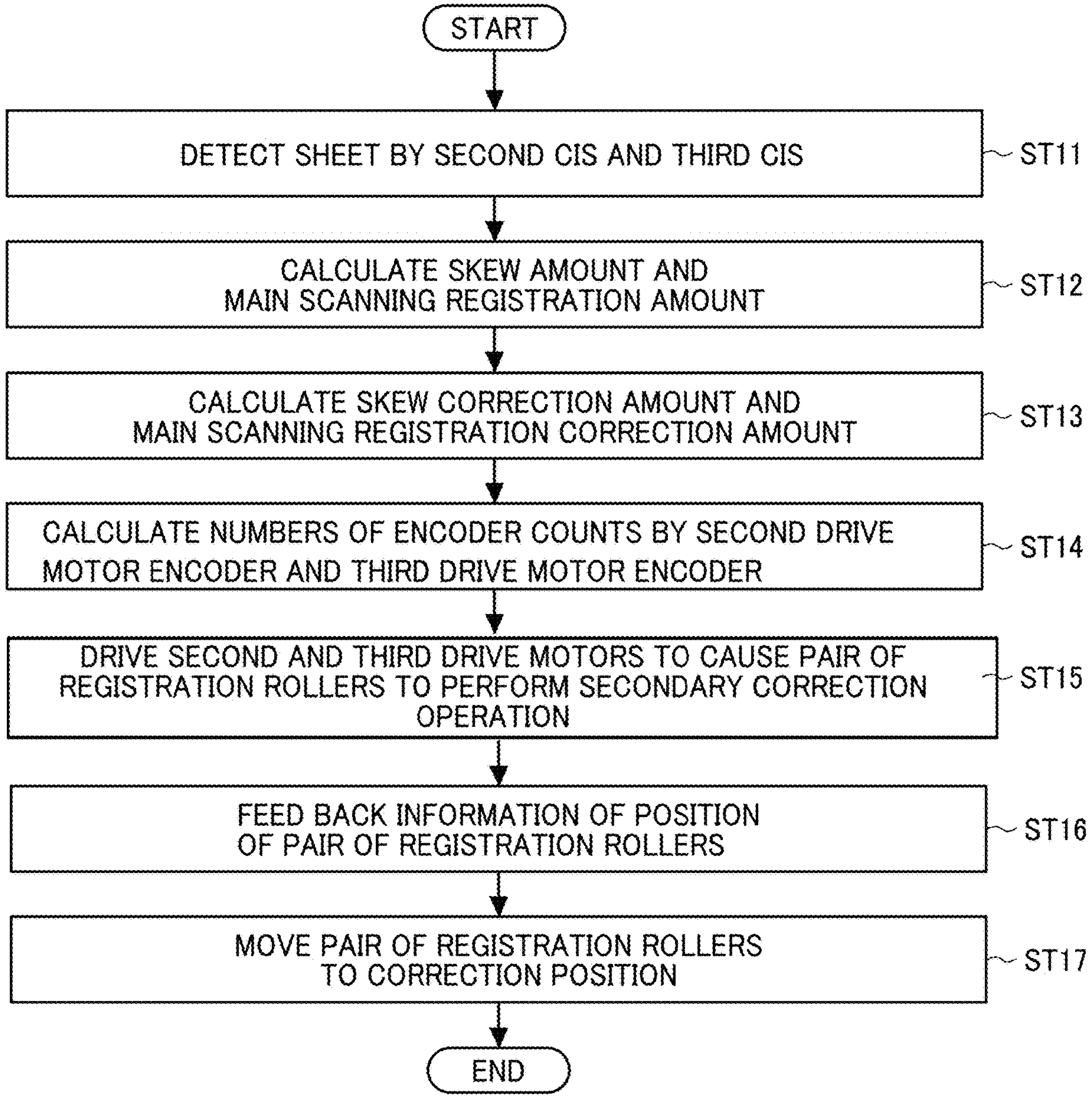
FIG. 8 is a flowchart of a secondary correction operation performed by the conveying device according to the first embodiment of the present disclosure.

FIG. 8 is a flowchart of the secondary correction operation performed by the conveying device 45.

First, the second CIS 23 and the third CIS 24 detect the sheet S (step ST11) to calculate the skew amount (i.e., amount of angular displacement) and the main scanning registration amount (i.e., amount of lateral displacement) (step ST12). Next, based on the detection results, the controller 36 calculates the skew correction amount and the main scanning registration correction amount (step ST13). Then, the second drive motor encoder 43 and the third drive motor encoder 44 calculate the respective numbers of encoder counts based on the correction amounts (step ST14).

According to the calculated numbers of encoder counts, the second drive motor driver 39 and the third drive motor driver 41 drives the second drive motor 31 and the third drive motor 33, respectively, so that the pair of registration rollers 18 rotates and simultaneously moves in the width direction of the sheet S to perform the secondary correction operation (step ST15). At this time, the second CIS 23 and the third CIS 24 consecutively detect the position information of the sheet S, so that the skew amount and the main scanning registration amount are calculated based on the position information and fed back. Then, the skew amount and the main scanning registration amount of the sheet S are consecutively corrected, so that the pair of registration rollers 18 moves by the predetermined amount of movement (step ST16). Then, as the pair of registration rollers 18 is moved to the predetermined correction position, the secondary correction operation completes (step ST17).

Thereafter, the sheet S is conveyed to the transfer nip region and, at the same time, the contact-separation unit causes the driven roller of the pair of sheet conveying rollers 17 to contact the drive roller of the pair of sheet conveying rollers 17 to the press-contact position at which the sheet S is nipped by the pair of sheet conveying rollers 17, the sheet S is conveyed toward the fixing device 15 by application of conveyance force of the photoconductor drum 4 and the transfer roller 8 and conveyance force of the pair of sheet conveying rollers 17.

Next, a description is given of the operations performed by the conveying device 45, with reference to FIGS. 9A to 14B.

FIGS. 9A to 14B are schematic plan views, each illustrating the primary correction operation performed by the conveying device according to the first embodiment of the present disclosure.

Figure 9B:
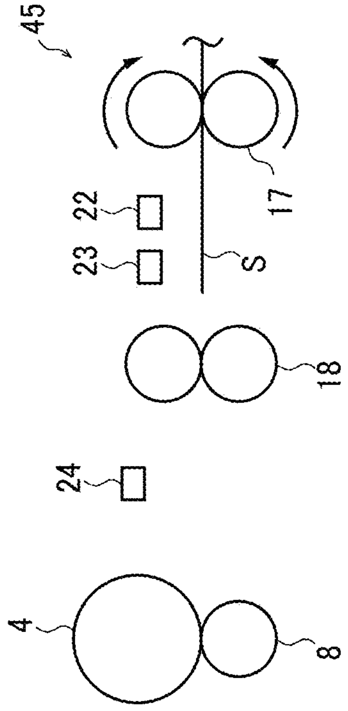
FIGS. 9A and 9B are schematic plan views, each illustrating the primary correction operation performed by the conveying device according to the first embodiment of the present disclosure.
Figure 9A:
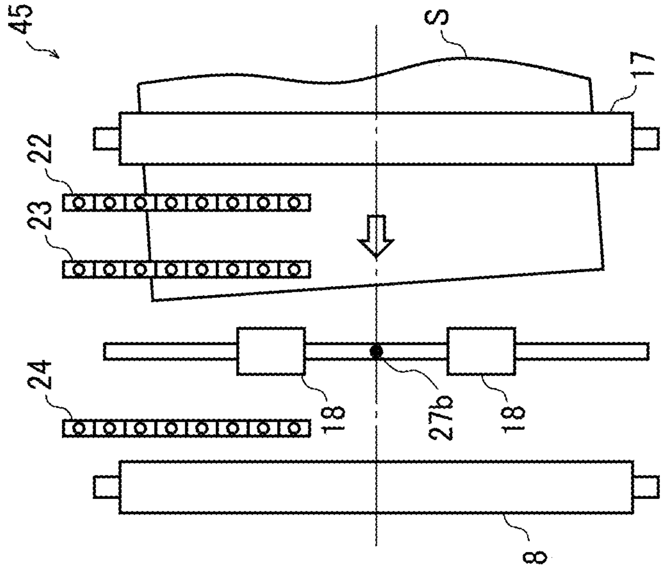

First, as illustrated in FIGS. 9A and 9B, the sheet S conveyed from the sheet feeding device 12 is nipped and conveyed by the pair of sheet conveying rollers 17 toward the pair of registration rollers 18. At this time, the pair of registration rollers 18 is in the initial state and is located at the above-described angular reference position and lateral reference position. Then, as the sheet S passes the first CIS 22 and reaches the second CIS 23, the first CIS 22 and the second CIS 23 detect the main scanning registration amount $\alpha$ of the sheet S and the skew amount $\beta$ of the sheet S simultaneously.

Figure 10B:
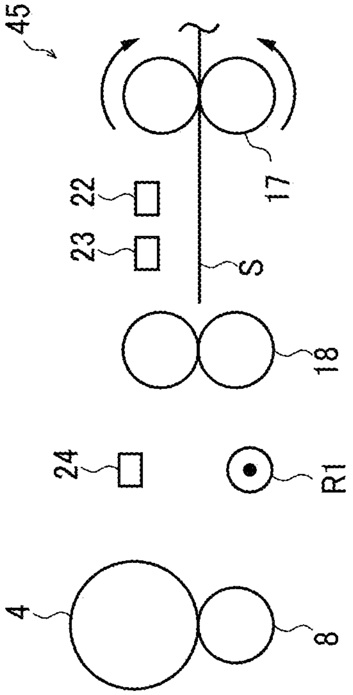
FIGS. 10A and 10B are schematic plan views, each illustrating the primary correction operation performed by the conveying device according to the first embodiment of the present disclosure, following the operation illustrated in FIGS. 9A and 9B.
Figure 10A:
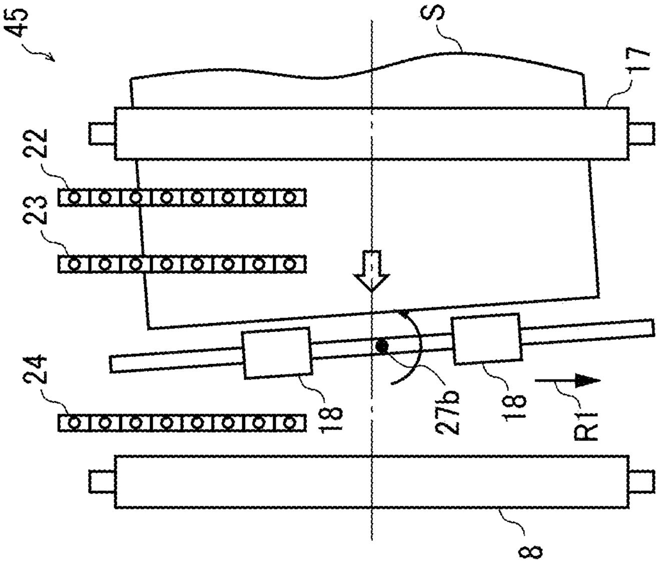

Then, as illustrated in FIGS. 10A and 10B, the pair of registration rollers 18 rotates together with the roller holding member 30 about the shaft portion **27*b* toward the same direction of inclination, by an angle $\beta$ that is the same amount as the skew amount $\beta$ detected by the first CIS 22 and the second CIS 23. Further, the pair of registration rollers 18 moves together with the roller holding member 30 by an amount $\alpha$ that is the same amount as the main scanning registration amount $\alpha$ detected by the first CIS 22 and the second CIS 23, in the same direction indicated by arrow R1**.

Figure 11A:
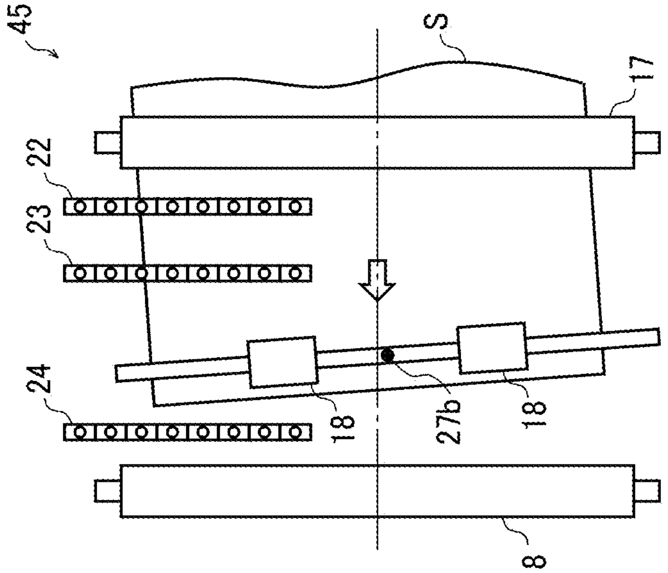
FIGS. 11A and 11B are schematic plan views, each illustrating the primary correction operation performed by the conveying device according to the first embodiment of the present disclosure, following the operation illustrated in FIGS. 10A and 10B.
Figure 11B:
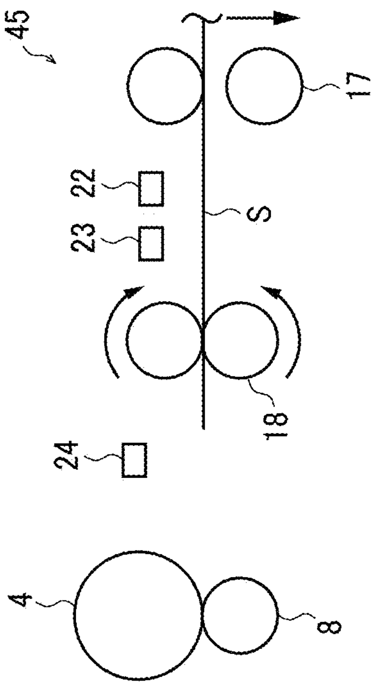

Then, as illustrated in FIGS. 11A and 11B, the pair of registration rollers 18 starts rotating immediately before the leading end of the sheet S reaches the pair of registration rollers 18, so that the sheet S is nipped and conveyed to the pair of registration rollers 18. At this time, the contact-separation unit causes the driven roller of the pair of sheet conveying rollers 17 to be separated from the drive roller of the pair of sheet conveying rollers 17 to the separation position, so that the sheet S is released from the pair of sheet conveying rollers 17.

Figure 12B:
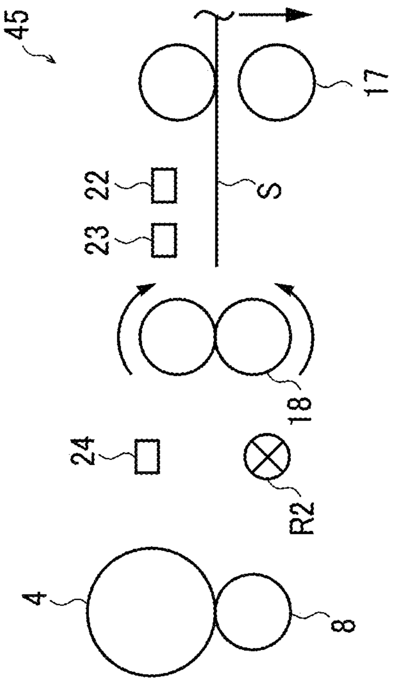
FIGS. 12A and 12B are schematic plan views, each illustrating the primary correction operation performed by the conveying device according to the first embodiment of the present disclosure, following the operation illustrated in FIGS. 11A and 11B.
Figure 12A:
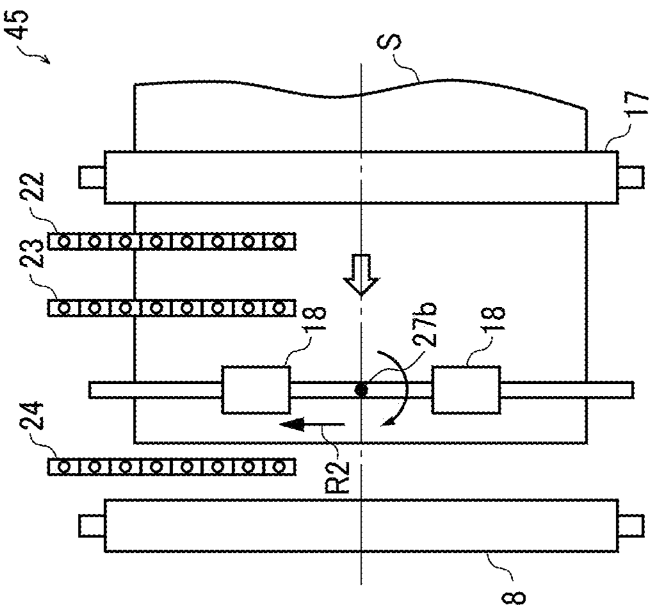

Then, as illustrated in FIGS. 12A and 12B, while nipping and conveying the sheet S, the pair of registration rollers 18 rotates about the shaft portion **27*b* to the angular reference position to cancel out the skew amount $\beta$ of the sheet S. At the same time, the pair of registration rollers 18 moves in the direction indicated by R1** to return to the lateral reference position to cancel out the main scanning registration amount $\alpha$ of the sheet S.

Figure 13B:
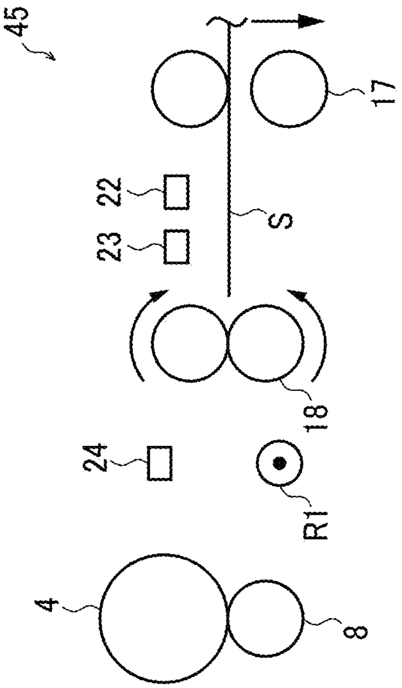
FIGS. 13A and 13B are schematic plan views, each illustrating the secondary correction operation performed by the conveying device according to the first embodiment of the present disclosure, following the operation illustrated in FIGS. 12A and 12B.
Figure 13A:
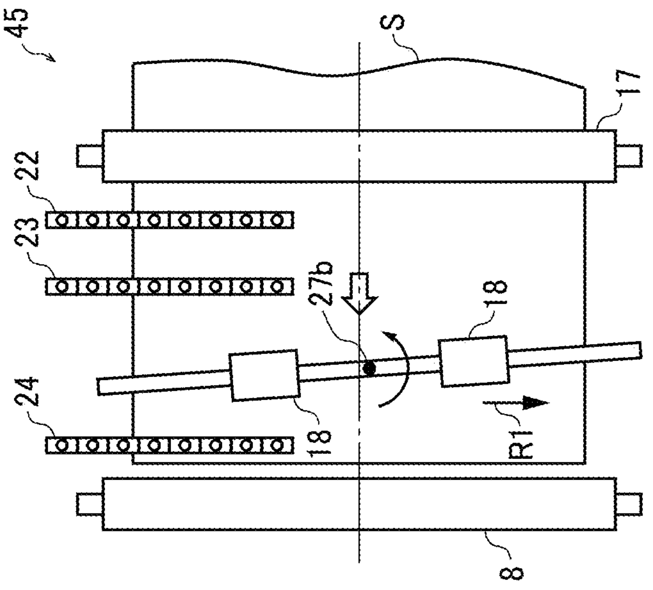

Then, as illustrated in FIGS. 13A and 13B, after the correction operations, when the sheet S conveyed by the pair of registration rollers 18 reaches the third CIS 24, the second CIS 23 and the third CIS 24 detect the main scanning registration amount $\alpha$ and the skew amount $\beta$ of the sheet S substantially sequentially. The pair of registration rollers 18 rotates in the opposite direction from the angular reference position about the shaft portion **27*b* by the angle $\beta$ that is the same amount as the skew amount $\beta$ detected by the first CIS 22 and the second CIS 23 substantially sequentially. At the same time, the pair of registration rollers 18 moves from the lateral reference position to the direction indicated by arrow R1 by the distance $\alpha$ that is the same amount as the main scanning registration amount $\alpha$ detected by the first CIS 22 and the second CIS 23**.

As described above, the sheet S is conveyed toward the transfer nip region while the skew correction operation and the main scanning registration correction are consecutively performed on the sheet S. At this time, the number of rotations of the pair of registration rollers 18 (i.e., conveyance speed of the sheet S up until the sheet S reaches the transfer roller 8) is varied so as to synchronize with movement of the toner image formed on the surface of the photoconductor drum 4.

Figure 14B:
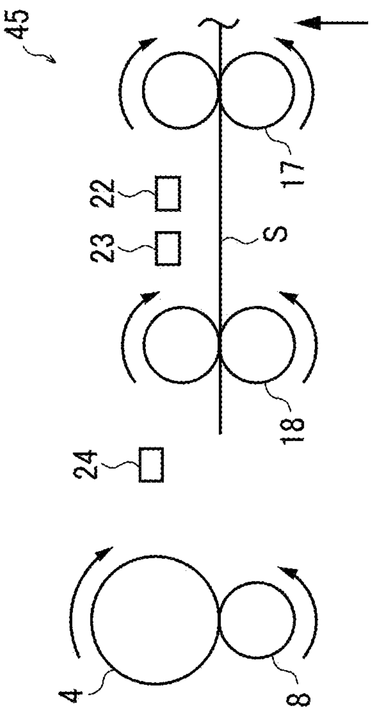
FIGS. 14A and 14B are schematic plan views, each illustrating the secondary correction operation performed by the conveying device according to the first embodiment of the present disclosure, following the operation illustrated in FIGS. 13A and 13B.
Figure 14A:
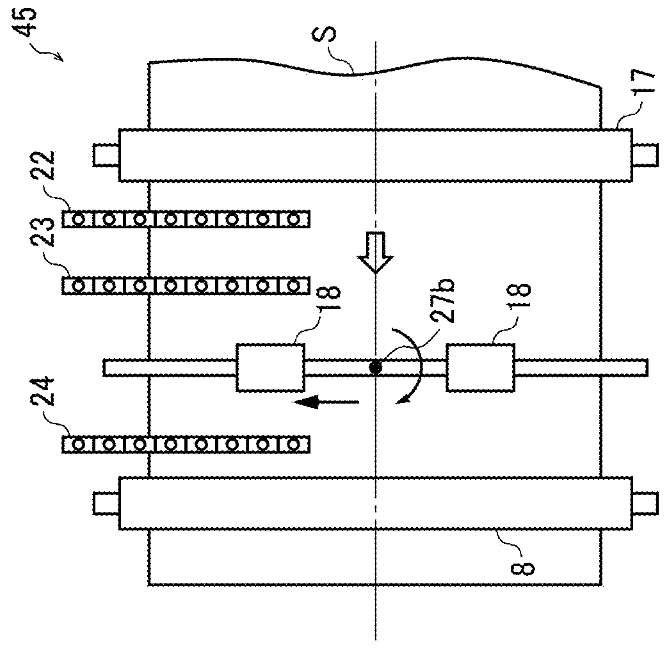

Then, as illustrated in FIGS. 14A and 14B, the sheet S is conveyed toward the transfer nip region, so that the toner image is transferred onto the sheet S at a desired position. Thereafter, the contact-separation unit causes the driven roller of the pair of sheet conveying rollers 17 to contact the drive roller of the pair of sheet conveying rollers 17 to the press-contact position at which the sheet S is nipped by the pair of sheet conveying rollers 17, so as to assist the pair of registration rollers 18 to convey the sheet S and prepare for the conveying operation of a subsequent sheet S.

Then, as the trailing end of the sheet S passes the pair of registration rollers 18, the pair of registration rollers 18 returns to the angular reference position and the lateral reference position for preparation of the skew correction and the main scanning registration correction of the sheet S angular displacement correction and the lateral displacement correction of the subsequent sheet S.

The reference color of the sheet S to be used is set to white in the conveying device 45 according to the present embodiment. The reference color of the sheet S is set to "white" since white sheets are generally used as the sheet S highly frequently. Therefore, assuming that a sheet S having the reference color of white is mainly used, the conveying device 45 has a configuration in which the first CIS 22, the second CIS 23, and the third CIS 24 detect the side edge Sa of the sheet S with high accuracy.

In the conveying device 45, respective portions of the housing of the conveying device 45 facing the first CIS 22, the second CIS 23, and the third CIS 24 are formed to have a color of the high optical absorptivity such as black. According to this configuration, light emitted from each light emitting unit of each of the first CIS 22, the second CIS 23, and the third CIS 24 has different incidence rates of the reflected light on the white sheet S from the side edge Sa as the boundary. That is, the incidence rate of the reflected light in the light receiving unit is relatively low on the outside of the sheet S and the incidence rate of the reflected light in the light receiving unit is relatively high on the inside of the sheet S. Thus, the overall output value (waveform) of the first CIS 22, the second CIS 23, and the third CIS 24 clearly has a difference in height by the position of the side edge Sa of the sheet S as a boundary, and therefore the position of the side edge Sa of the sheet S is detected with high accuracy.

However, in a case in which a sheet S that has a color having different reflectance to white as a reference color (e.g., sheet S with color having relatively low reflectance such as black or gray) is conveyed, the first CIS 22, the second CIS 23, and the third CIS 24 with the previous setting may fail to detect the position of the side edge Sa of the sheet S.

As described above, the conveying device 45 has respective portions facing the first CIS 22, the second CIS 23, and the third CIS 24 in the housing. The respective portions are likely to be formed to have a color of the high optical absorptivity such as black. According to this configuration, when the sheet S having a color of black or grey is conveyed, light emitted from the light emitting unit of each of the first CIS 22, the second CIS 23, and the third CIS 24 has different incidence rates of the reflected light on the sheet S from the side edge Sa as the boundary. That is, the incidence rate of the reflected light into the light receiving unit is relatively low on both the outside and inside of the sheet S. Thus, it is difficult that the overall output value (waveform) of the first CIS 22, the second CIS 23, and the third CIS 24 has a clear difference in height by the position corresponding to the side edge Sa of the sheet S as a boundary, and the position of the side edge Sa of the sheet S fails to be detected with high accuracy. Therefore, this configuration of a comparative conveying device makes it difficult that the first CIS 22, the second CIS 23, and the third CIS 24 detect the skew amount and the main scanning registration amount of the sheet S accurately, resulting that the skew correction and the main scanning registration correction are not performed with high accuracy.

In order to prevent such inconvenience, the first CIS 22, the second CIS 23, and the third CIS 24 are adjusted, in a case in which the type of the sheet S is changed; the reference color is switched to another color; and the reflectance of light on the sheet S is changed. However, the configuration of the comparative conveying device is assumed to perform sheet detection and position correction for two or more times, that is, a conveying device having a configuration in which a single performance of sheet detection and position correction is not allowed due to the limitation of the configuration. Further, in the sheet reflectance detection using at least one detector, since it is assumed that the sheet is detected in the first detection using the reference setting, the reference settings are conducted. Therefore, the reference settings cannot be applied to a sheet that is not be detected. In addition, the position of the sheet cannot be corrected with high accuracy. Further, since the position correction of the sheet is performed using the result of the first detection, malfunction or sheet conveyance jam is likely to occur. In order to eliminate these inconveniences, a description is given of the adjustment operation performed by the first CIS 22, the second CIS 23, and the third CIS 24 according to the present disclosure.

Next, descriptions are given below of a jig configuration according to the present embodiment.

Since the contact image sensors of the first CIS 22, the second CIS 23, and the third CIS 24 are identical to each other, the following description is made with the configuration of the first CIS 22.

Figure 15A:
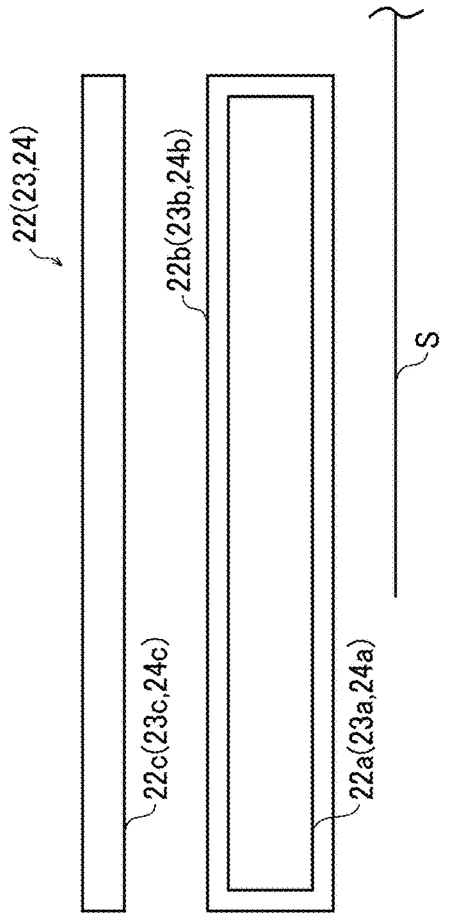
FIGS. 15A and 15B are schematic diagrams, each illustrating an end position detector according to the first embodiment of the present disclosure.
Figure 15B:
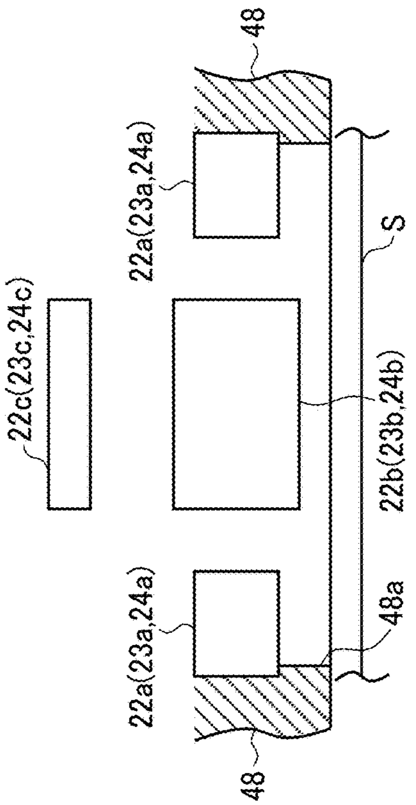

FIGS. 15A and 15B are schematic diagrams, each illustrating an end position detector according to the first embodiment of the present disclosure.

As illustrated in FIG. 15A that is viewed from the left side of FIG. 3, the first CIS 22 includes two light emitting units 22*a*, a lens array 22*b*, and a light receiving unit 22*c*. Each light emitting unit 22*a* functions as a light emitter has a plurality of light sources including LEDs. The lens array 22*b* is divided into the same number of the plurality of light sources of each light emitting unit 22*a*. Similarly, the light receiving unit 22*c* that functions as a light receiver is divided into the same number of the plurality of light sources of each light emitting unit 22*a*. FIG. 15B is a view of the configuration of the first CIS 22, viewed from the right side of FIG. 15A.

As illustrated in FIG. 15B, each light emitting unit 22*a* is attached to a fixed member 48 including the housing of the conveying device 45 The fixed member 48 has an opening 48*a* through which light emitted by the light emitting unit 22*a* passes.

As illustrated in FIGS. 15A and 15B, the sheet S passes below each light emitting unit 22*a* and the lens array 22*b*. At this time, the light emitted from each light source of the light emitting unit 22*a* is reflected on the sheet S and then received by the light receiving unit 22*c* via the lens array 22*b*. However, since the light emitted from the light emitting unit 22*a* is not reflected on the sheet S in a portion through which the sheet S does not pass, the light received by the light receiving unit 22*c* is limited to the light reflected on the housing of the conveying device 45, and therefore the amount of received light is reduced. As a result, the side edge Sa of the sheet S differentiates the portion of the light receiving unit 22*c* in which the amount of received light is relatively high, from the portion of the light receiving unit 22*c* in which the amount of received light is relatively low. Accordingly, this boundary is detected as the side edge Sa of the sheet S.

Note that, as described above, the contact image sensors of the first CIS 22, the second CIS 23, and the third CIS 24 have the contact image sensors identical to each other. Specifically, the second CIS 23 includes two light emitting units 23*a*, a lens array 23*b*, and a light receiving unit 23*c*. Similarly, the third CIS 24 includes two light emitting units 24*a*, a lens array 24*b*, and a light receiving unit 24*c*.

Next, a description is given of the controller 36 that functions as an adjuster to perform the adjustment operation of the first CIS 22, the second CIS 23, and the third CIS 24.

As illustrated in FIG. 6, the controller 36 includes an output adjustment unit 46 that adjusts the outputs of the first CIS 22, the second CIS 23, and the third CIS 24. The output adjustment unit 46 adjusts the number of light emission per time and the amount of light emitted from the plurality of light sources of the light emitting units 22*a*, 23*a*, and 24*a* of the first CIS 22, the second CIS 23, and the third CIS 24, based on signals from the light receiving units 22*c*, 23*c*, and 24*c* of the first CIS 22, the second CIS 23, and the third CIS 24. Details of the adjustment operation are described below.

The first CIS 22, the second CIS 23, and the third CIS 24, on which the output adjustment unit 46 performs output adjustment, include recording units 22*d*, 23*d*, and 24*d*, respectively. Each of the recording units 22*d*, 23*d*, and 24*d* is capable of recording adjustment data according to the types of sheets S. Each of the recording units 22*d*, 23*d*, and 24*d* includes non-volatile memory such as a ROM and a flash drive. The number of light emission per time and the amount of light emitted from each of the light emitting units 22*a*, 23*a*, and 24*a* according to the color or reflectance, of light of the sheet S are stored in each of the recording units 22*d*, 23*d*, and 24*d*.

Figure 20B:
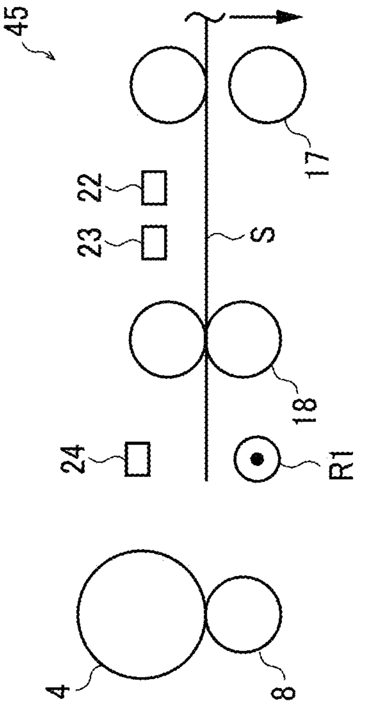
FIG. 20B is a schematic front view of the end position detector of FIG. 20A.
Figure 20A:
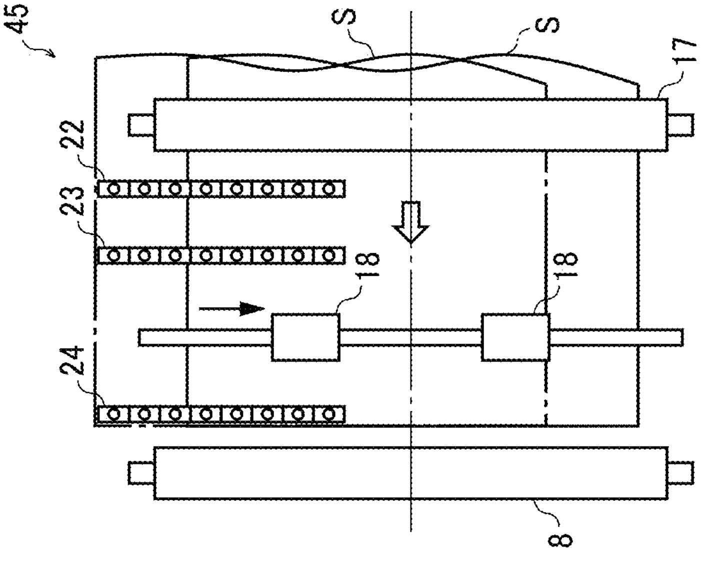
FIG. 20A is a schematic plan view of the end position detector included in the conveying device according to the first embodiment of the present disclosure, when the end position detector performs the adjustment operation following FIG. 19A.
Figure 21:
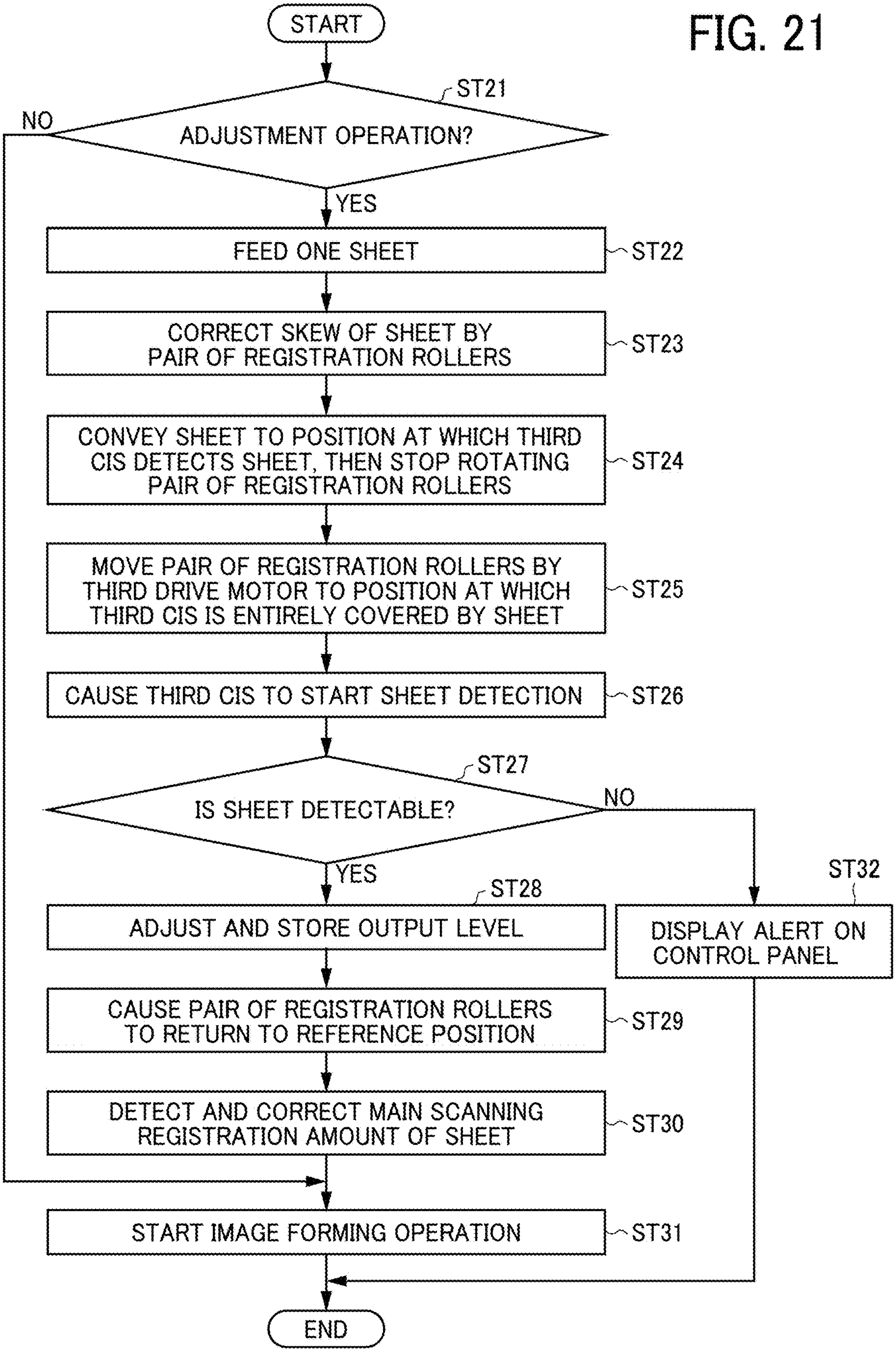
FIG. 21 is a flowchart of the flow of the adjustment operation performed by the end position detector in the conveying device according to the first embodiment of the present disclosure.

A description is given of the adjustment operation on the first CIS 22, the second CIS 23, and the third CIS 24 based on the above-described configuration, with reference to the operation diagrams illustrated in FIGS. 16A to 20B and the flowchart of FIG. 21.

FIGS. 16A to 20B are schematic views, each illustrating the end position detector included in the conveying device according to the first embodiment of the present disclosure, when the end position detector performs an adjustment operation.

FIG. 21 is a flowchart of the flow of the adjustment operation performed by the end position detector in the conveying device according to the first embodiment of the present disclosure.

Figure 16B:
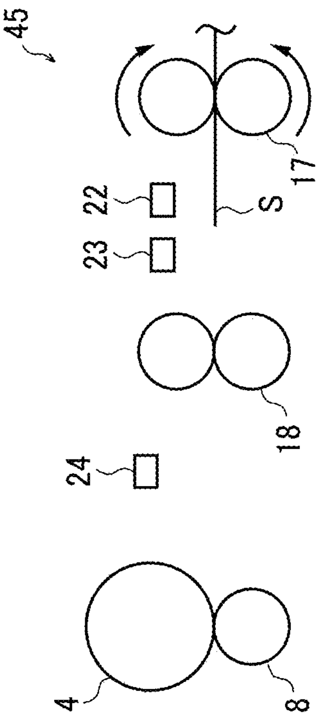
FIG. 16B is a schematic front view of the end position detector of FIG. 16A.
Figure 16A:
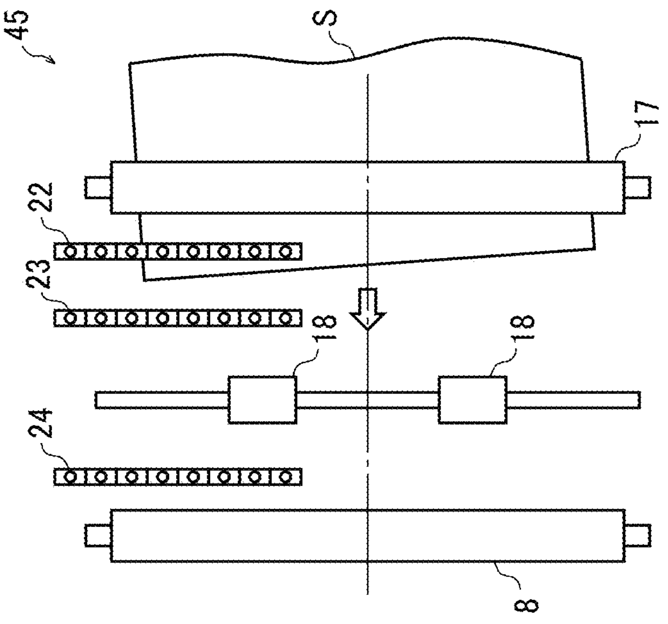
FIG. 16A is a schematic plan view of the end position detector included in the conveying device according to the first embodiment of the present disclosure, when the end position detector performs an adjustment operation.

After the adjustment operation on each of the first CIS 22, the second CIS 23, and the third CIS 24 is set via the control panel 37, when the controller 36 determines whether the adjustment operation is to be performed, a start key is pressed (step ST21). When the controller 36 determines that the adjustment operation is to be performed and the start key is pressed (YES in step ST21), one sheet S is separated from the rest of the sheet S in the sheet feeding device 12 and is fed from the sheet feeding device 12 (step ST22). After being conveyed by the sheet feed roller 19 and the pairs of sheet conveying rollers 16, the sheet S is further conveyed by the pair of sheet conveying rollers 17 as illustrated in FIGS. 16A and 16B.

Figure 17B:
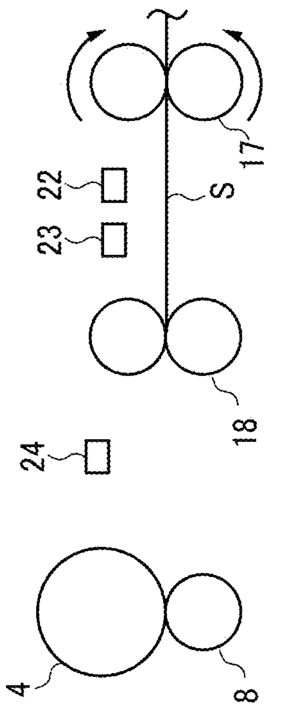
FIG. 17B is a schematic front view of the end position detector of FIG. 17A.
Figure 17A:
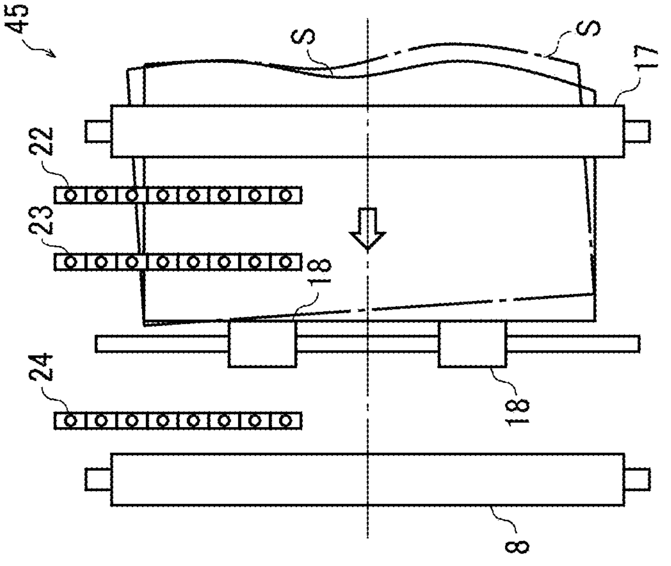
FIG. 17A is a schematic plan view of the end position detector included in the conveying device according to the first embodiment of the present disclosure, when the end position detector performs the adjustment operation following FIG. 16A.

The leading end of the sheet S contacts the nip region of the pair of registration rollers 18 while rotation of the pair of registration rollers 18 is stopped. Then, the sheet S is slightly conveyed by the pair of sheet conveying rollers 17. Due to this conveyance, the posture of the sheet S that is skewed as indicated by a broken line in FIG. 17A is corrected to the position as indicated by a solid line in FIG. 17A (step ST23). In other words, the skew of the sheet S is corrected by the pair of registration rollers 18. Note that the sheet S contacts the nip region of the pair of registration rollers 18 so as to cause skew of the sheet S is corrected in the present embodiment. Alternatively, the sheet S may contact a member other than the pair of registration rollers 18 for correcting the skew of the sheet S.

Figure 18B:
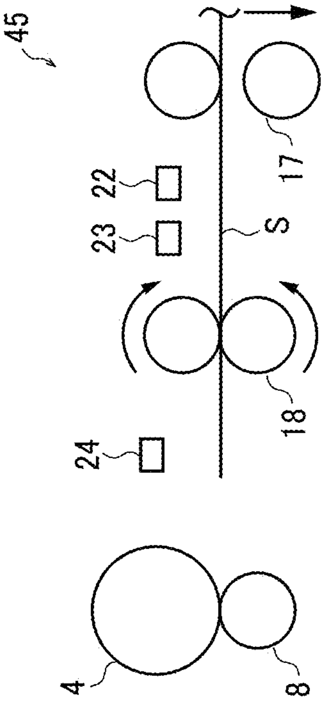
FIG. 18B is a schematic front view of the end position detector of FIG. 18A.
Figure 18A:
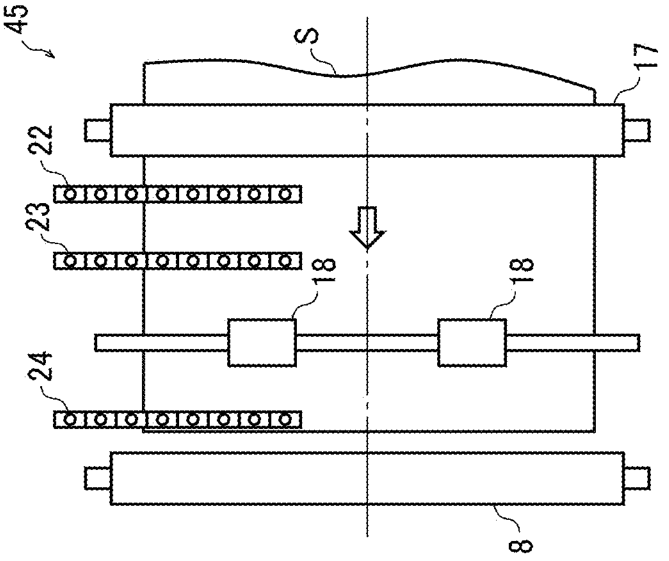
FIG. 18A is a schematic plan view of the end position detector included in the conveying device according to the first embodiment of the present disclosure, when the end position detector performs the adjustment operation following FIG. 17A.
Figure 19B:
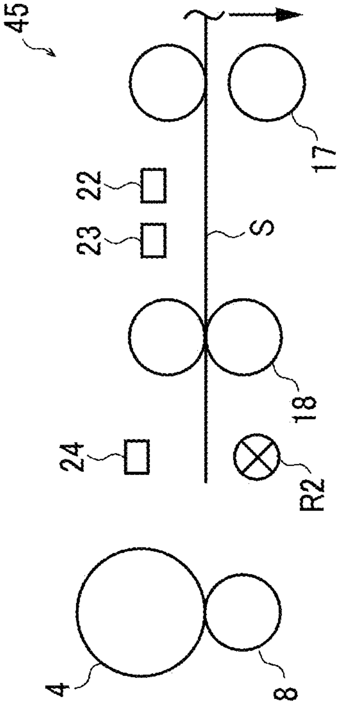
FIG. 19B is a schematic front view of the end position detector of FIG. 19A.
Figure 19A:
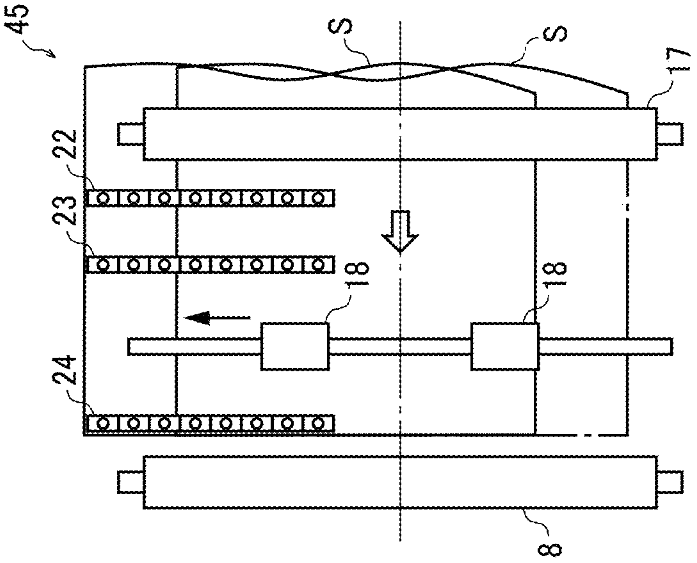
FIG. 19A is a schematic plan view of the end position detector included in the conveying device according to the first embodiment of the present disclosure, when the end position detector performs the adjustment operation following FIG. 18A.

When the skew correction of the sheet S is completed, the pair of registration rollers 18 starts rotating to convey the sheet S toward downstream in the sheet conveyance direction. As the pair of registration rollers 18 starts conveying the sheet S, the contact-separation unit causes the driven roller of the pair of sheet conveying rollers 17 to separate from the drive roller of the pair of sheet conveying rollers 17 to the separation position, so that the sheet S is released from the pair of sheet conveying rollers 17. Then, as illustrated in FIGS. 18A and 18B, the encoder that detects the number of rotations of the first drive motor 25 detects that the sheet S is conveyed to the position at which the third CIS 24 detects the leading end of the sheet S, and then the pair of registration rollers 18 stops rotating (step ST24).

Thereafter, the third drive motor 33 drives the pair of registration rollers 18 to move upward while the sheet S is nipped by the pair of registration rollers 18. Then, as the third drive motor encoder 44 detects that the pair of registration rollers 18 is moved from the position indicated by a broken line in FIG. 19A to the position indicated by a solid line in FIG. 19A, in other words, to the position at which the third CIS 24 is entirely covered by the sheet S, the third drive motor 33 stops driving the pair of registration rollers 18 to position the pair of registration rollers 18 and the sheet S (step ST25).

Next, the controller 36 sends instruction to the third CIS 24 to start detection of the sheet S (step ST26). In response to this instruction from the controller 36, the light emitting units 24*a* of the third CIS 24 emit light and the light receiving unit 24*c* of the third CIS 24 receives light reflected on the sheet S. The controller 36 determines whether the light receiving unit 24*c* detects transmitted light when the whole light sources of the light emitting units 24*a* emit light at the maximum value (step ST27). In other words, the controller 36 determines whether the sheet S is detectable or not. When it is determined that the light receiving unit 24*c* detects transmitted light (YES in step ST27), the controller 36 adjusts the output level of the light emitting unit 24*a* so that the light receiving unit 24*c* comes to be capable of detecting the reflected light when the light sources are turned on at the least number of light emission per time and the amount of light emitted from the light sources. Then, as the sufficient output level of the light emitting unit 24*a* for detecting the sheet S is determined, the controller 36 stores information of the determined output level associated with the type of used sheet S and the reflectance of light, into the recording unit 24*d* (step ST28). Note that the information stored in the recording unit 24*d* is also recorded in the recording unit 22*d* of the first CIS 22 and the recording unit 23*d* of the second CIS 23.

After the output level of the third CIS 24 is adjusted and the information is stored in the recording unit 24*d*, the third drive motor 33 is driven again to cause the pair of registration rollers 18 to return to the reference position, and the sheet S located at the position indicated by a broken line in FIG. 20 is returned to the initial position (reference position) indicated by a solid line in FIG. 20 (step ST29).

As the pair of registration rollers 18 is moved to the reference position, the third CIS 24 detects the main scanning registration amount of the sheet S to perform the main scanning registration correction on the sheet S, which is similar to the above-described operation (step ST30). Then, similar to the above description, the secondary correction operation is performed, then the sheet S is conveyed to the transfer nip region, and the image forming operation is performed (step ST31).

When the controller 36 determines that the adjustment operation is not to be performed (NO in step ST21), the process goes to step ST31 to skip a series of operations and the image forming operation is performed. Further, when the controller 36 determines that the light receiving unit 24*c* does not detect the sheet S (NO in step ST27), the determination is displayed on the control panel 37 as an alert and end the operation.

As described above, with the configuration of the present disclosure, in the adjustment operation of each of the first CIS 22, the second CIS 23, and the third CIS 24, the third drive motor 33 causes the pair of registration rollers 18, which has moved to the position at which the sheet S covers the third CIS 24 while nipping the sheet S, to move to a position off the sheet conveyance passage. Thereafter, the controller 36 executes output adjustment of the third CIS 24 so that the third CIS 24 detects the sheet S. According to the output adjustment, each of the first CIS 22, the second CIS 23, and the third CIS 24 detect various types of sheets S correctly without multiple detections and multiple corrections and without performing basic adjustment in advance. This configuration provides a conveying device that performs the skew correction and main scanning registration correction of the sheet S correctly with a simple adjustment.

Further, in the present disclosure, the third drive motor 33 drives the pair of registration rollers 18 to move after the contact-separation unit has operated to move the driven roller of the pair of sheet conveying rollers 17 to the separation position at which the sheet S is released from the pair of sheet conveying rollers 17. This configuration reduces a load applied on the sheet S, thereby enhancing the accuracy of the main scanning registration correction.

Further, in the present disclosure, the third drive motor 33 corrects the positional deviation amount, in other words, the main scanning registration amount, in the width direction of the sheet S based on the detection results of the end position of the sheet S by the first CIS 22, the second CIS 23, and the third CIS 24. According to this configuration, the main scanning registration correction of the sheet S is performed correctly.

Further, in the present disclosure, the first CIS 22 includes the light receiving unit 22*c* and the light emitting units 22*a* with multiple light sources, the second CIS 23 includes the light receiving unit 23*c* and the light emitting units 23*a* with multiple light sources, and the third CIS 24 includes the light receiving unit 24*c* and the light emitting units 24*a* with multiple light sources. In adjustment of the first CIS 22, the second CIS 23, and the third CIS 24, the controller 36 adjusts the number of light emission per time and the amount of light emitted from each of the light emitting units 22*a*, 23*a*, and 24*a*. Accordingly, fine adjustment is performed on each of the first CIS 22, the second CIS 23, and the third CIS 24.

Further, in the present disclosure, when the third CIS 24 detects the sheet S, the controller 36 adjusts the number of light emission per time and the amount of light emitted from the light sources of the light emitting units 24*a*, based on the output of the light receiving unit 24*c*. According to this configuration, the setting of each of the first CIS 22, the second CIS 23, and the third CIS 24 is changed according to the sheet S to be used for image formation, and detection according to the various types of sheets S is performed.

Further, in the present disclosure, after the sheet S has moved off the sheet conveyance passage in the adjustment operation of each of the first CIS 22, the second CIS 23, and the third CIS 24, the sheet S is returned to the original position again. According to this configuration, the sheets S used in the adjustment is used in the image forming operation without wasting any sheet, and therefore the cost is reduced, and the image formation efficiency is enhanced.

Further, in the present disclosure, the first CIS 22, the second CIS 23, and the third CIS 24 include the recording units 22*d*, 23*d*, and 24*d*, respectively. Each of the recording units 22*d*, 23*d*, and 24*d* records (stores) adjustment data of each type of sheets S. The controller 36 adjusts the first CIS 22, the second CIS 23, and the third. CIS 24, based on the adjustment data recorded (stored) in the recording units 22*d*, 23*d*, and 24*d*, respectively. According to this configuration, the adjustment operation is performed based on information of a previously recorded sheet S, and the adjustment operation is efficiently performed.

Further, in the present disclosure, the fixed member 48 that supports each of the first CIS 22, the second CIS 23, and the third CIS 24 includes the opening 48*a*. According to this configuration, lights emitted from the light emitting units 22*a*, 23*a*, and 24*a* are collected, resulting in prevention of misdetection of the background of a sheet S.

Figure 22:
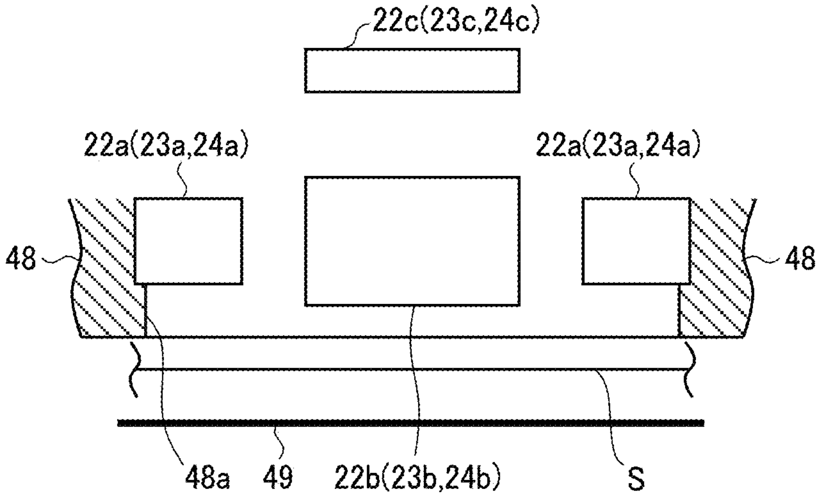
FIG. 22 is a diagram illustrating a light absorbing member of a variation from the first embodiment of the present disclosure.

FIG. 22 is a diagram illustrating a light absorbing member of a variation from the first embodiment of the present disclosure.

As a variation of the present embodiment, as illustrated in FIG. 22, a light absorbing member 49 that functions as a light absorber may be disposed below the light emitting units 22*a*, 23*a*, and 24*a* and the lens arrays 22*b*, 23*b*, and 24*b* in the housing (i.e., the fixed member 48) of the conveying device 45. The light absorbing member 49 is made of a raised black member, specifically, a felted fabric material.

According to this configuration, lights emitted from the light emitting units 22*a*, 23*a*, and 24*a* are reflected on the housing of the conveying device 45 at the lower reflectance, resulting in a reduction of misdetection of the sheet S.

Next, a description is given of the configuration of a conveying device according to a second embodiment of the present disclosure.

FIG. 23 illustrates a conveying device 50 according to the second embodiment of the present disclosure.

The configuration of the conveying device 50 according to the second embodiment is basically identical to the configuration of the conveying device 45 according to the first embodiment but includes some differences from the conveying device 45. Specifically, different from the conveying device 45 according to the first embodiment, however, the conveying device 50 according to the second embodiment does not include the first CIS 22 and the second CIS 23. Further, while the conveying device 45 includes the roller holding member 30 that rotatably supports the pair of registration rollers 18 is rotatably supported by the frame 27, the conveying device 50 includes the roller holding member 30 that is not rotatably supported by the frame 27, in other words, that is fixed to the frame 27. Further, while the conveying device 45 includes the second drive motor 31 that functions as a skew corrector, the conveying device 50 does not include the second drive motor 31 since the roller holding member 30 does not rotate.

Next, a description is given of operations performed by the conveying device 50.

FIGS. 23A to 27B are schematic views, each illustrating the end position detector included in the conveying device according to a second embodiment of the present disclosure, when the end position detector performs the adjustment operation.

Figure 23B:
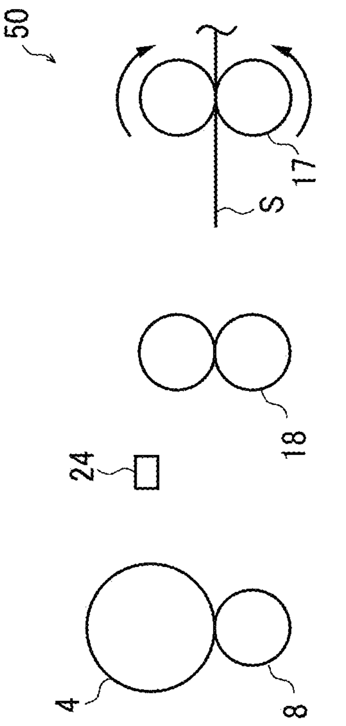
FIG. 23B is a schematic front view of the end position detector of FIG. 23A.
Figure 23A:
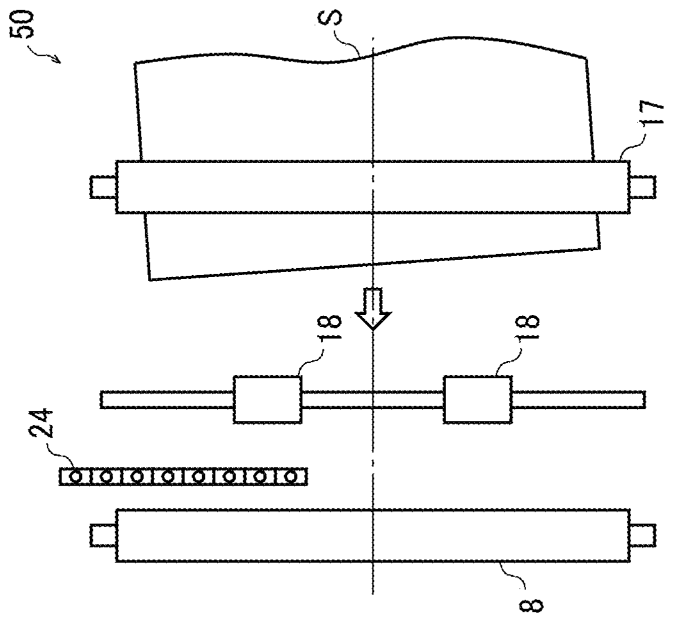
FIG. 23A is a schematic plan view of the end position detector included in the conveying device according to a second embodiment of the present disclosure, when the end position detector performs the adjustment operation.
Figure 24B:
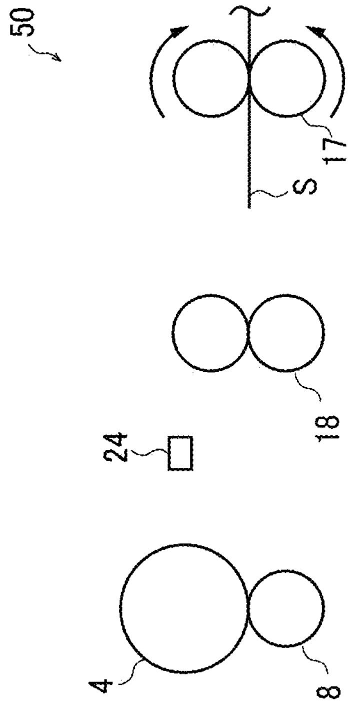
FIG. 24B is a schematic front view of the end position detector of FIG. 24A.
Figure 24A:
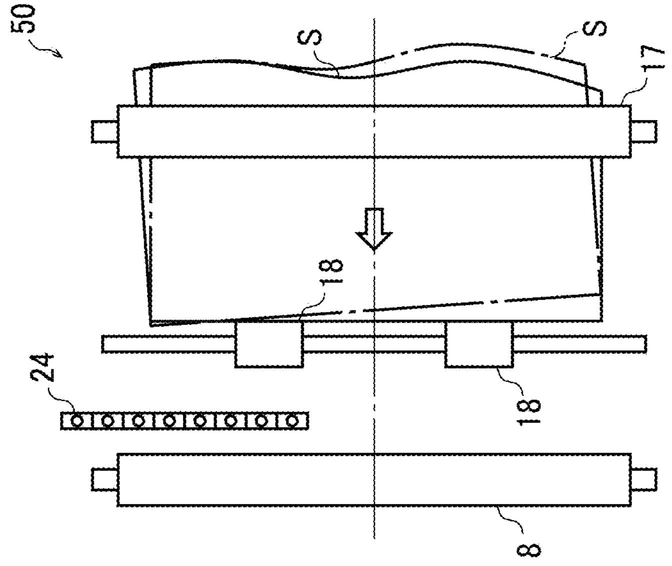
FIG. 24A is a schematic plan view of the end position detector included in the conveying device according to the second embodiment of the present disclosure, when the end position detector performs the adjustment operation following FIG. 23A.

First, as illustrated in FIGS. 23A and 23B, the sheet S fed from the sheet feeding device 12 is nipped and conveyed by the pair of sheet conveying rollers 17 toward the pair of registration rollers 18 in a direction indicated by white arrow. When the sheet S reaches the pair of registration rollers 18, the sheet S brings the leading end to contact the nip region of the pair of registration rollers 18 while the pair of registration rollers 18 is stopped. From this position in this state, the sheet S is slightly conveyed by the pair of sheet conveying rollers 17. Due to this configuration, the posture of the sheet S that is skewed as indicated by the broken line in FIG. 24A is corrected to the position as indicated by the solid line in FIG. 24A. In this configuration, the pair of registration rollers 18 functions as a skew corrector. Note that the sheet S contacts the nip region of the pair of registration rollers 18 so as to cause skew of the sheet S is corrected in the present embodiment. Alternatively, the sheet S may contact a member other than the pair of registration rollers 18 for correcting the skew of the sheet S. In this case, the member to which the leading end of the sheet S contacts functions as a skew corrector.

Figure 25B:
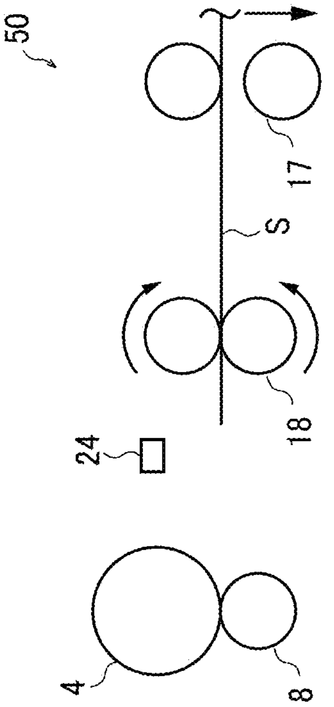
FIG. 25B is a schematic front view of the end position detector of FIG. 25A.
Figure 25A:
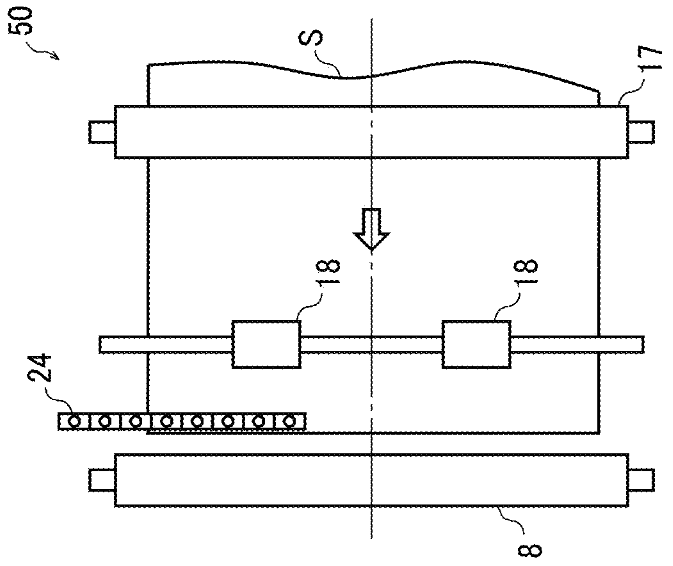
FIG. 25A is a schematic plan view of the end position detector included in the conveying device according to the second embodiment of the present disclosure, when the end position detector performs the adjustment operation following FIG. 24A.
Figure 26B:
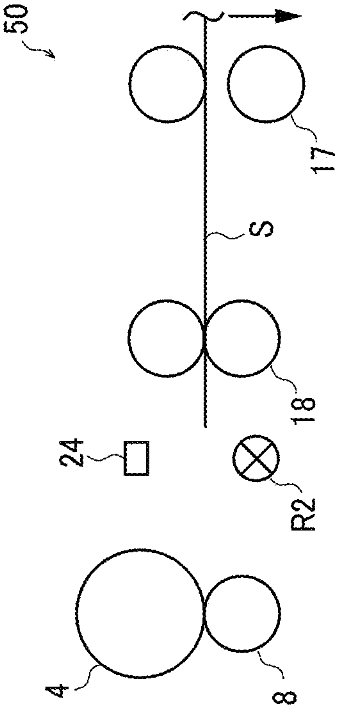
FIG. 26B is a schematic front view of the end position detector of FIG. 26A.
Figure 26A:
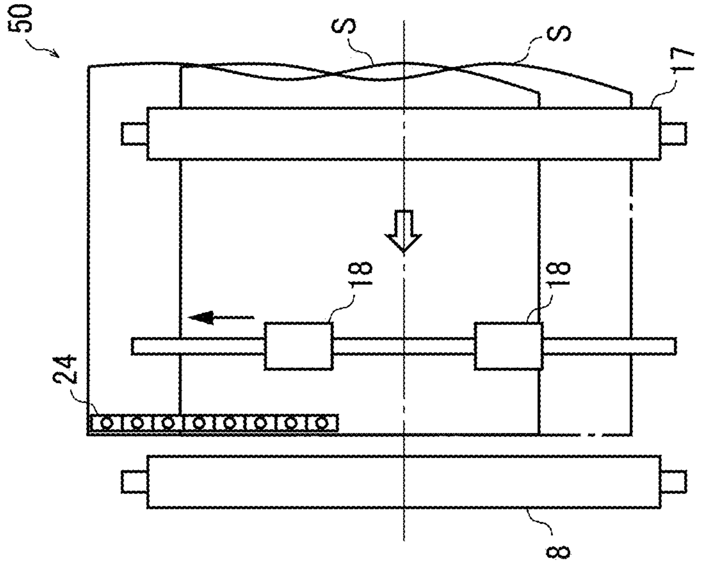
FIG. 26A is a schematic plan view of the end position detector included in the conveying device according to the second embodiment of the present disclosure, when the end position detector performs the adjustment operation following FIG. 25A.

As the skew correction of the sheet S is completed, the pair of registration rollers 18 rotates to convey the sheet S toward downstream in the sheet conveyance direction and simultaneously the contact-separation unit moves the driven roller of the pair of sheet conveying rollers 17 to the separation position at which the sheet S is released from the pair of sheet conveying rollers 17. Then, as illustrated in FIGS. 25A and 25B, as the sheet S is conveyed until the leading end of the sheet S is detected by the third CIS 24, the pair of registration rollers 18 stops rotating.

In response to the detection of side edge Sa of the sheet S by the third CIS 24, the controller 36 causes detection of the main scanning registration amount of the sheet S from the position of the side edge Sa. Thereafter, the controller 36 sends operation instruction to the third drive motor 33 to drive the third drive motor 33. As a result, the pair of registration rollers 18 is moved to change the position to cancel out the main scanning registration amount detected by the controller 36. In this case, the third drive motor 33 functions as a lateral deviation corrector.

As described above, after the skew correction and the main scanning registration correction are performed on the sheet S, the sheet S is conveyed toward the transfer nip region. At this time, the number of rotations of the pair of registration rollers 18 is varied so as to synchronize with a timing of movement of the toner image formed on the surface of the photoconductor drum 4.

Now, a description is given of the adjustment operation of the third CIS 24 according to the second embodiment.

After the adjustment operation on the third CIS 24 is set via the control panel 37, as the start key is pressed, one sheet S is separated from the rest of the sheets S in the sheet feeding device 12 and is fed from the sheet feeding device 12. After being conveyed by the sheet feed roller 19 and the pairs of sheet conveying rollers 16, the sheet S is further conveyed by the pair of sheet conveying rollers 17 as illustrated in FIGS. 23A and 23B.

When the sheet S reaches the pair of registration rollers 18, the sheet S brings the leading end to contact the nip region of the pair of registration rollers 18 while the pair of registration rollers 18 is stopped. From this position in this state, the sheet S is slightly conveyed by the pair of sheet conveying rollers 17. Due to this configuration, the posture of the sheet S that is skewed as indicated by the broken line in FIG. 24A is corrected to the position as indicated by the solid line in FIG. 24A. In this configuration, the pair of registration rollers 18 functions as a skew corrector. Note that the sheet S contacts the nip region of the pair of registration rollers 18 so as to cause skew of the sheet S is corrected in the present embodiment. Alternatively, the sheet S may contact a member other than the pair of registration rollers 18 for correcting the skew of the sheet S. In this case, the member to which the leading end of the sheet S contacts functions as a skew corrector.

As the skew correction of the sheet S is completed, the pair of registration rollers 18 rotates to convey the sheet S toward downstream in the sheet conveyance direction and simultaneously the contact-separation unit moves the driven roller of the pair of sheet conveying rollers 17 to the separation position at which the sheet S is released from the pair of sheet conveying rollers 17. Then, as illustrated in FIGS. 25A and 25B, the encoder that detects the number of rotations of the first drive motor 25 detects that the sheet S is conveyed to the position at which the third CIS 24 detects the leading end of the sheet S, and then the pair of registration rollers 18 stops rotating.

Thereafter, the third drive motor 33 drives the pair of registration rollers 18 to move upward while the sheet S is nipped by the pair of registration rollers 18 in FIGS. 25A and 25B. Then, as the third drive motor encoder 44 detects that the pair of registration rollers 18 is moved from the position indicated by a broken line in FIG. 26A to the position indicated by a solid line in FIG. 26A, in other words, to the position at which the light emitting units 24*a*, the lens array 24*b*, and the light receiving unit 24*c* of the third CIS 24 are entirely covered by the sheet S, the third drive motor 33 stops driving the pair of registration rollers 18 to position the pair of registration rollers 18 and the sheet S at the predetermined detection position.

Next, the controller 36 sends the operation instruction to the third CIS 24 to start detection of the sheet S, as in the first embodiment. Then, similar to the first embodiment, as the sufficient output level of the light emitting unit 24*a* for detecting the sheet S is determined, the controller 36 stores information of the determined output level associated with the type of used sheet S and the reflectance of light, into the recording unit 24*d*.

Figure 27B:
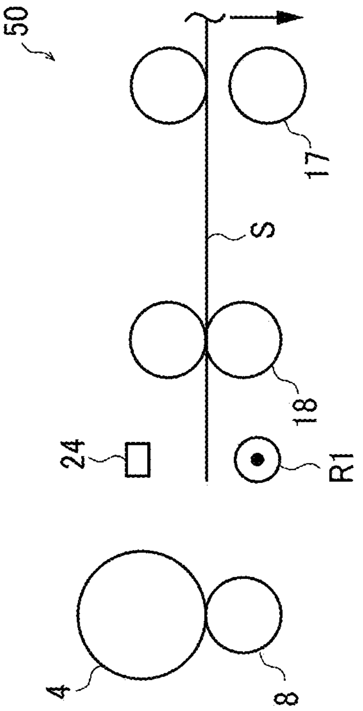
FIG. 27B is a schematic front view of the end position detector of FIG. 27A.
Figure 27A:
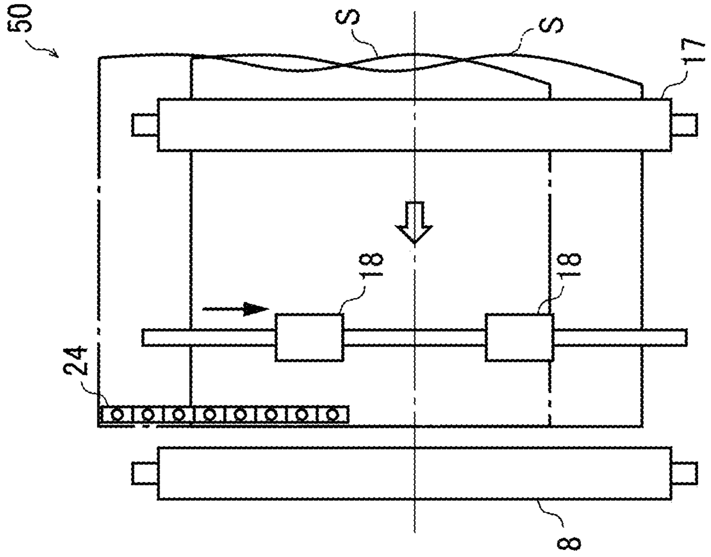
FIG. 27A is a schematic plan view of the end position detector included in the conveying device according to the second embodiment of the present disclosure, when the end position detector performs the adjustment operation following FIG. 26A.

After the output level of the third CIS 24 is adjusted and the information is stored in the recording unit 24*d*, the third drive motor 33 is driven again to cause the pair of registration rollers 18 to return to the reference position, and the sheet S located at the position indicated by a broken line in FIG. 27A is returned to the initial position indicated by a solid line in FIG. 27A. As the pair of registration rollers 18 is moved to the reference position, the third CIS 24 detects the main scanning registration amount of the sheet S to perform the main scanning registration correction on the sheet S, which is similar to the above-described operation. After completion of the correction operation, the controller 36 starts the pair of registration rollers 18 to rotate to convey the sheet S toward the transfer nip region, so that the image forming operation is performed.

Similar to the first embodiment, As described above, the configuration of the second embodiment in which a single CIS is used as an end position detector achieves the effect similar to the first embodiment.

The image forming apparatus 1 according to the above-described embodiments and variations of the present disclosure is a monochrome copier, as illustrated in FIG. 1 but is not limited to this configuration. Alternatively, the image forming apparatus may be a color image forming apparatus that forms full color images on recording media. The image forming apparatus according to the present disclosure may be, e.g., a printer, a facsimile machine, or a multifunction peripheral (MFP) having at least two of copying, printing, scanning, and facsimile functions. In the above-described embodiments, the sheet S for image formation is employed as a recording medium on which an image is formed. However, the sheet S is not limited to the recording medium but also includes thick paper, postcard, envelope, plain paper, thin paper, coated paper, art paper, tracing paper, overhead projector (OHP) sheet and film, or resin film. Further, the sheet S may be any material as long as the sheet S is a sheet-like, optically transparent or reflective material that receives an image on the surface.

The above-described embodiment is illustrative and does not limit the present disclosure. Thus, numerous additional modifications and variations are possible in light of the above teachings. For example, elements and/or features of the embodiment and variation may be combined with each other and/or substituted for each other within the scope of the present disclosure.

For example, in the above-described embodiment, each of the first CIS 22, the second CIS 23, and the third CIS 24 functions as an end position detector of a reflection type. However, the structure of each of the first CIS 22, the second CIS 23, and the third CIS 24 is not limited to this structure. Alternatively, a transmission type CIS or another type of detection sensor may be employed as an end position detector.

Such embodiments and variations thereof are included in the scope and gist of the embodiments of the present disclosure and are included in the embodiments described in claims and the equivalent scope thereof.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A conveying device comprising:

a first pair of nipping rollers configured to contact and separate from each other, the first pair of nipping rollers being configured to nip and convey a recording medium;

a second pair of nipping rollers upstream from the first pair of nipping rollers in a conveyance direction along a conveyance passage of the recording medium, the second pair of nipping rollers being configured to contact and separate from each other;

a drive motor including a first encoder and configured to drive and rotate the first pair of nipping rollers;

a position corrector device including a second encoder, the position corrector device configured to correct a position of the recording medium in a width direction of the recording medium conveyed in the conveyance passage;

an end position detector extending outward from within the conveyance passage in the width direction of the recording medium, the end position detector being configured to detect an end position of the recording medium in the width direction; and circuitry configured to adjust an output of the end position detector to, stop, by the drive motor, conveyance of the recording medium in response to detection, by the first encoder, of an arrival of a leading end of the recording medium at a position at which the end position detector detects the leading end of the recording medium; and stop an operation of the position corrector device in response to a detection, by the second encoder, that the recording medium which has been stopped is moved toward an outside of the conveyance passage to a position at which the end position detector is covered by the recording medium.

2. The conveying device according to claim 1, wherein the circuitry is configured to activate the position corrector device after the second pair of nipping rollers releases the recording medium.

3. The conveying device according to claim 1, wherein the position corrector device is configured to correct an amount of positional deviation in the width direction, based on a detection result of the end position detector.

4. The conveying device according to claim 1, wherein the end position detector includes:

a light emitter including a plurality of light sources, and a light receiver configured to output a signal according to an amount of light emitted from the light emitter and reflected on or transmitted through the recording medium; and the circuitry is configured to adjust a number of light emission per time of the light emitter and the amount of light emitted from the light emitter.

5. The conveying device according to claim 4, wherein the circuitry is configured to adjust the number of light emission per time of the light emitter and the amount of light emitted from the light emitter based on the output of the light receiver in response to detection of the recording medium by the end position detector.

6. The conveying device according to claim 4, further comprising:

a fixed member configured to support the end position detector; and the fixed member includes an opening configured to allow light emitted by the light emitter to pass, and the opening is at a position facing the end position detector.

7. The conveying device according to claim 4, further comprising:

a light absorber at a position facing the end position detector, and the light absorber is configured to absorb light emitted by the light emitter.

8. The conveying device according to claim 7, wherein the light absorber is a raised black member.

9. The conveying device according to claim 1, wherein the circuitry is configured to:

cause the position corrector device to move the recording medium from a first position on the conveyance passage to a second position off the conveyance passage during the adjustment of the output of the end position detector;

adjust the end position detector; and cause the position corrector device to return the recording medium to the first position on the conveyance passage.

10. The conveying device according to claim 1, wherein the end position detector includes a memory in which adjustment data of each type of the recording medium is stored; and the circuitry is configured to adjust the end position detector based on the adjustment data stored in the memory.

11. An image forming apparatus comprising:

an image forming device configured to form an image on a recording medium conveyed by a conveying device; and the conveying device includes, a first pair of nipping rollers configured to contact and separate from each other, the first pair of nipping rollers being configured to nip and convey a recording medium;

a second pair of nipping rollers upstream from the first pair of nipping rollers in a conveyance direction along a conveyance passage of the recording medium, the second pair of nipping rollers being configured to contact and separate from each other;

a drive motor including a first encoder and configured to drive and rotate the first pair of nipping rollers;

a position corrector device including a second encoder, the position corrector device configured to correct a position of the recording medium in a width direction of the recording medium conveyed in the conveyance passage;

an end positon detector extending outward from within the conveyance passage in the width direction of the recording medium, the end position detector being configured to detect an end position of the recording medium in the width direction; and circuitry configured to adjust an output of the end position detector to, stop, by the drive motor, conveyance of the recording medium in response to detection, by the first encoder, of an arrival of a leading end of the recording medium at a position at which the end position detector detects the leading end of the recording medium, and stop an operation of the position corrector device in response to a detection, by the second encoder, that the recording medium which has been stopped is moved toward an outside of the conveyance passage to a position at which the end position detector is covered by the recording medium.

12. The image forming apparatus according to claim 11, wherein the circuitry is configured to activate the position corrector device after the second pair of nipping rollers releases the recording medium.

13. The image forming apparatus according to claim 11, wherein the position corrector device is configured to correct an amount of positional deviation in the width direction, based on a detection result of the end position detector.

14. The image forming apparatus according to claim 11, wherein the end position detector includes:

a light emitter including a plurality of light sources, and a light receiver configured to output a signal according to an amount of light emitted from the light emitter and reflected on or transmitted through the recording medium; and the circuitry is configured to adjust a number of light emission per time of the light emitter and the amount of light emitted from the light emitter.

15. The image forming apparatus according to claim 14, wherein the circuitry is configured to adjust the number of light emission per time of the light emitter and the amount of light emitted from the light emitter based on the output of the light receiver in response to detection of the recording medium by the end position detector.

16. The image forming apparatus according to claim 14, wherein the conveying device further includes:

a fixed member configured to support the end position detector; and the fixed member includes an opening configured to allow light emitted by the light emitter to pass, and the opening is at a position facing the end position detector.

17. The image forming apparatus according to claim 14, wherein the conveying device further includes:

a light absorber at a position facing the end position detector, and the light absorber is configured to absorb light emitted by the light emitter.

18. The image forming apparatus according to claim 17, wherein the light absorber is a raised black member.

19. The image forming apparatus according to claim 11, wherein the circuitry is configured to:

cause the position corrector device to move the recording medium from a first position on the conveyance passage to a second position off the conveyance passage during the adjustment of the output of the end position detector;

adjust the end position detector; and cause the position corrector device to return the recording medium to the first position on the conveyance passage.

20. The image forming apparatus according to claim 11, wherein the end position detector includes a memory in which adjustment data of each type of the recording medium is stored; and the circuitry is configured to adjust the end position detector based on the adjustment data stored in the memory.

* * * * *